(12) United States Patent
Curran et al.

(10) Patent No.: US 11,549,191 B2
(45) Date of Patent: *Jan. 10, 2023

(54) CORROSION RESISTANCE FOR ANODIZED PARTS HAVING CONVEX SURFACE FEATURES

(71) Applicant: Apple Inc., Cupertino, CA (US)

(72) Inventors: James A. Curran, Morgan Hill, CA (US); Zechariah D. Feinberg, San Francisco, CA (US); Sonja R. Postak, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 16/277,072

(22) Filed: Feb. 15, 2019

(65) Prior Publication Data
US 2020/0080219 A1    Mar. 12, 2020

Related U.S. Application Data

(60) Provisional application No. 62/729,346, filed on Sep. 10, 2018.

(51) Int. Cl.
*C25D 11/02*      (2006.01)
*C25D 11/12*      (2006.01)
(Continued)

(52) U.S. Cl.
CPC .............. *C25D 11/02* (2013.01); *C25D 11/08* (2013.01); *C25D 11/12* (2013.01); *C25D 11/16* (2013.01);
(Continued)

(58) Field of Classification Search
None
See application file for complete search history.

(56) References Cited

U.S. PATENT DOCUMENTS 2,692,851 A    10/1954   Burrows
3,388,050 A     6/1968   Wainer et al.
(Continued)

FOREIGN PATENT DOCUMENTS

CH         691064 A5    4/2001
CN       1254028 A    5/2000
(Continued)

OTHER PUBLICATIONS

Chinese Patent Application No. 201680050544.6—Second Office Action dated Sep. 27, 2019.
(Continued)

*Primary Examiner* — Wojciech Haske
(74) *Attorney, Agent, or Firm* — Dorsey & Whitney LLP

(57) ABSTRACT

Anodic oxide coatings that provide corrosion resistance to parts having protruding features, such as edges, corners and convex-shaped features, are described. According to some embodiments, the anodic oxide coatings include an inner porous layer and an outer porous layer. The inner layer is adjacent to an underlying metal substrate and is formed under compressive stress anodizing conditions that allow the inner porous layer to be formed generally crack-free. In this way, the inner porous layer acts as a barrier that prevents water or other corrosion-inducing agents from reaching the underlying metal substrate. The outer porous layer can be thicker and harder than the inner porous layer, thereby increasing the overall hardness of the anodic oxide coating.

18 Claims, 16 Drawing Sheets

(51) Int. Cl.
  *C25D 11/08*   (2006.01)
  *C25D 11/16*   (2006.01)
  *C25D 11/18*   (2006.01)
  *C25D 11/24*   (2006.01)

(52) U.S. Cl.
  CPC ............ *C25D 11/18* (2013.01); *C25D 11/243* (2013.01); *C25D 11/246* (2013.01)

(56) References Cited

U.S. PATENT DOCUMENTS

| | | |
|---|---|---|
| 3,411,994 A | 11/1968 | Wainer et al. |
| 3,723,258 A | 3/1973 | Podell et al. |
| 3,985,629 A | 10/1976 | Kimura |
| 4,039,355 A | 8/1977 | Takahashi et al. |
| 4,066,516 A | 1/1978 | Sato |
| 4,189,360 A | 2/1980 | Woods et al. |
| 4,483,751 A | 11/1984 | Murayama et al. |
| 4,518,468 A | 5/1985 | Fotland et al. |
| 4,606,796 A | 8/1986 | Hanazima et al. |
| 4,631,112 A | 12/1986 | Usui et al. |
| 4,856,326 A | 8/1989 | Tsukamoto |
| 4,894,127 A | 1/1990 | Wong et al. |
| 4,987,766 A | 1/1991 | Brar et al. |
| 5,066,368 A | 11/1991 | Pasqualoni et al. |
| 5,078,845 A | 1/1992 | Kunugihara et al. |
| 5,277,788 A | 1/1994 | Nitowski et al. |
| 5,336,341 A | 8/1994 | Maejima et al. |
| 5,472,788 A | 12/1995 | Benitez-Garriga |
| 5,705,225 A | 1/1998 | Dornfest et al. |
| 5,919,561 A | 7/1999 | Fuchs et al. |
| 6,027,629 A | 2/2000 | Hisamoto et al. |
| 6,235,409 B1 | 5/2001 | Serafin et al. |
| 6,339,958 B1 | 1/2002 | Tsui et al. |
| 6,581,446 B1 | 6/2003 | Deneuville et al. |
| 7,166,205 B2 | 1/2007 | Kuo et al. |
| 7,527,872 B2 | 5/2009 | Steele et al. |
| 7,732,056 B2 | 6/2010 | Bhatnagar et al. |
| 7,820,300 B2 | 10/2010 | Dolan |
| 8,016,948 B2 | 9/2011 | Wang et al. |
| 8,145,411 B2 | 3/2012 | Watanabe et al. |
| 8,309,237 B2 | 11/2012 | Levendusky et al. |
| 8,318,256 B2 | 11/2012 | Ishii et al. |
| 8,535,505 B2 | 9/2013 | Yi et al. |
| 8,691,403 B2 | 4/2014 | Amakusa et al. |
| 8,950,465 B2 | 2/2015 | Lin et al. |
| 8,962,163 B2 | 2/2015 | Shimao et al. |
| 8,968,548 B2 | 3/2015 | Lai et al. |
| 9,133,559 B2 | 9/2015 | Silverman et al. |
| 9,312,511 B2 | 4/2016 | Mandlik et al. |
| 9,349,536 B2 | 5/2016 | Lee et al. |
| 9,359,686 B1 | 6/2016 | Curran et al. |
| 9,512,510 B2 | 12/2016 | Hatta |
| 9,669,604 B2 | 6/2017 | Tatsumi et al. |
| 9,869,030 B2 | 1/2018 | Curran et al. |
| 9,869,623 B2 | 1/2018 | Hamann et al. |
| 2003/0196907 A1 | 10/2003 | Viola |
| 2004/0004003 A1 | 1/2004 | Hesse |
| 2004/0129574 A1 | 7/2004 | Kia et al. |
| 2005/0061680 A1 | 3/2005 | Dolan |
| 2005/0106403 A1 | 5/2005 | Yui |
| 2006/0019035 A1 | 1/2006 | Munz et al. |
| 2006/0086475 A1 | 4/2006 | Miyashita et al. |
| 2006/0204780 A1 | 9/2006 | Vega et al. |
| 2007/0000583 A1 | 1/2007 | Rioja et al. |
| 2008/0274375 A1 | 11/2008 | Ng et al. |
| 2008/0283408 A1 | 11/2008 | Nishizawa |
| 2009/0041988 A1 | 2/2009 | Ho et al. |
| 2009/0050485 A1 | 2/2009 | Wada et al. |
| 2009/0152120 A1 | 6/2009 | Cao et al. |
| 2009/0233113 A1 | 9/2009 | Hisamoto et al. |
| 2010/0024534 A1 | 2/2010 | Li et al. |
| 2010/0264036 A1 | 10/2010 | Hatanaka et al. |
| 2010/0326839 A1 | 12/2010 | Morikawa et al. |
| 2011/0252874 A1 | 10/2011 | Patten et al. |
| 2011/0284383 A1 | 11/2011 | Cabot et al. |
| 2011/0297319 A1 | 12/2011 | Chen et al. |
| 2012/0000783 A1 | 1/2012 | Suda et al. |
| 2012/0103819 A1 | 5/2012 | Chang et al. |
| 2012/0298513 A1 | 11/2012 | Shimao et al. |
| 2013/0008796 A1 | 1/2013 | Silverman et al. |
| 2013/0029094 A1 | 1/2013 | Chang et al. |
| 2013/0075262 A1 | 3/2013 | Teng |
| 2013/0153427 A1 | 6/2013 | Tatebe |
| 2013/0156635 A1 | 6/2013 | Lee et al. |
| 2013/0302641 A1 | 11/2013 | Zhang et al. |
| 2013/0319866 A1 | 12/2013 | Browning et al. |
| 2013/0319868 A1 | 12/2013 | Yoshida et al. |
| 2013/0319872 A1 | 12/2013 | Woodhull et al. |
| 2014/0061054 A1 | 3/2014 | Ye |
| 2014/0083861 A1 | 3/2014 | Askin et al. |
| 2014/0166490 A1 | 6/2014 | Tatebe et al. |
| 2014/0190739 A1 | 7/2014 | Zhou et al. |
| 2014/0246127 A1 | 9/2014 | Hatta |
| 2014/0262790 A1 | 9/2014 | Levendusky et al. |
| 2015/0029414 A1 | 1/2015 | Hur et al. |
| 2015/0090373 A1 | 4/2015 | Gable et al. |
| 2015/0132541 A1 | 5/2015 | McDonald et al. |
| 2015/0211141 A1 | 7/2015 | Hosokawa et al. |
| 2015/0368515 A1 | 12/2015 | Lu et al. |
| 2016/0060783 A1* | 3/2016 | Curran .................. C25D 11/04 205/175 |
| 2016/0237586 A1 | 8/2016 | Curran et al. |
| 2016/0289858 A1 | 10/2016 | Curran et al. |
| 2016/0312374 A1 | 10/2016 | Duffy et al. |
| 2017/0051425 A1 | 2/2017 | Curran et al. |
| 2017/0051426 A1 | 2/2017 | Curran et al. |
| 2017/0121837 A1 | 5/2017 | Tatebe et al. |
| 2018/0049337 A1 | 2/2018 | Curran et al. |
| 2018/0237936 A1 | 8/2018 | Curran et al. |
| 2019/0037721 A1 | 1/2019 | Curran et al. |

FOREIGN PATENT DOCUMENTS

| | | |
|---|---|---|
| CN | 1616709 | 5/2005 |
| CN | 1632178 | 6/2005 |
| CN | 1774158 A | 5/2006 |
| CN | 1965618 A | 5/2007 |
| CN | 101048277 A | 10/2007 |
| CN | 101287861 A | 10/2008 |
| CN | 101298690 A | 11/2008 |
| CN | 101325849 A | 12/2008 |
| CN | 101970723 A | 2/2011 |
| CN | 102333897 A | 1/2012 |
| CN | 102654782 A | 9/2012 |
| CN | 102666894 A | 9/2012 |
| CN | 103484737 A | 1/2014 |
| CN | 103484916 A | 1/2014 |
| CN | 103526088 A | 1/2014 |
| CN | 103732772 A | 4/2014 |
| CN | 103930600 A | 7/2014 |
| CN | 103938250 A | 7/2014 |
| CN | 104619891 A | 5/2015 |
| CN | 104762538 A | 7/2015 |
| CN | 108531958 A | 9/2018 |
| EP | 997545 A1 | 5/2000 |
| EP | 1397244 A1 | 3/2004 |
| EP | 1688020 A1 | 8/2006 |
| EP | 2301760 A2 | 3/2011 |
| EP | 2817948 A1 | 12/2014 |
| JP | S4925538 B1 | 3/1974 |
| JP | 33047937 A | 2/1991 |
| JP | 2000313996 A | 11/2000 |
| JP | 2002302795 A | 10/2002 |
| JP | 2009209426 A | 9/2009 |
| JP | 2009209726 A | 9/2009 |
| KR | 20120021616 A | 3/2012 |
| KR | 101235350 B1 | 2/2013 |
| WO | 2010099258 A1 | 9/2010 |
| WO | 2013123770 A1 | 8/2013 |
| WO | 2013192579 A1 | 12/2013 |
| WO | 2014045886 A1 | 3/2014 |

(56) References Cited

FOREIGN PATENT DOCUMENTS

| WO | 2014149194 A1 | 9/2014 |
|---|---|---|
| WO | 2015199639 A1 | 12/2015 |
| WO | 2018121212 A1 | 7/2018 |

OTHER PUBLICATIONS

International Search Report and Written Opinion for PCT Application No. PCT/US2015/025000 dated Jan. 26, 2016.
Garcia-Vergara, S. et al; "Morphology of enriched alloy layers in an anodized Al—Cu alloy" Applied Surface Science, 205 (2003),p. 121-127.
Alwitt, RS. and RC. McClung , "Mechanical Properties of Anodized Aluminum Coatings"; Proceedings of the SUR/FIN792, American Electroplaters and Surface Finishers Society, Atlanta, Georgia, Jun. 1992.
Goueffon et al.; "Study of Degradation Mechanisms of Black Anodic Films in Simulated Space Environment", 11th International Symposium on Materials in Space Environment, Sep. 2009, 8 pages. Open Archive Toulouse Archive Ouverte—HAL—archives-ouvertes.fr https://hal.archives-ouvertes.fr/hal-01851864/document.
Henkel Corporation "Bonderite M-Ed 9000 Anodizing Seal (Known as Anoseal 9000)" Technical Process Bulletin Issued Jun. 10, 2013.
Hao at el., "Sealing Processes of Anodic Coatings—Past, Present, and Future", Metal Finishing, vol. 98, Issue 12, Dec. 2000, p. 8-18.
International Search Report & Written Opinion for PCT Application No. PCT/US2015/010736 dated Oct. 29, 2015.
International Search Report & Written Opinion for PCT Application No. PCT/US2015/024349 dated Dec. 17, 2015.
International Search Report & Written Opinion for PCT Application No. PCT/US2014/053595 dated Jun. 24, 2015.
Habazaki et al., "Nanoscale Enrichments of Substrate Elements in the Growth of Thin Oxide Films", Corrosion Science, vol. 39, No. 4, pp. 731-737, 1997.
Vesborg et al., "Addressing the terawatt challenge: scalability in the supply of chemical elements for renewable energy," RSC Advances, 2, pp. 7933-7947, 2012.
European Patent Application No. 16150283.6—European Search Report dated Jun. 9, 2016.
International Patent Application No. PCT/US2016/043256—International Search Report and Written Opinion dated Oct. 12, 2016.
Diggle et al., Incorporation of anions: "Anodic oxide films on aluminum", Chemical Reviews, vol. 69, pp. 365-405 (1969), (41 Pages).
Charles Grubbs; "Anodizing of Aluminium", Metal Finishing. vol. 105, Issue 10, 2007, pp. 397-412, (18 pages). ScienceDirect, Elsevier, available online Dec. 31, 2007. https://www.sciencedirect.com/science/article/pii/S002605760780359X.
Milton Stevenson, "Anodizing", ASM Handbook vol. 5 (1994), 12 Pages.
Wang et al., "Brilliant and tunable color of carbon-coated thin anodic aluminum oxide films", Appl. Phys. Lett., 91, 2007, 4 Pages.
Brock, et al., "European Coatings Handbook", 2000, Curt R. Vincentz, (pp. 374-376), 5 Pages.
Taiwanese Patent Application No. 105125817—Office Action and Search Report dated Apr. 19, 2017.
Hohbach et al. WADC technical report 55-150, Part VI, Project No. 7360, 1957.
Chinese Application for Invention No. 201610011395.4—First Office Action dated Jul. 21, 2017.
Saenz de Miera et al. Surface and Interface Analysis, published online in Wiley Interscience: Feb. 5, 2010, 42, 241-246.
John C. Ion. Laser Processing of Engineering Materials. Elsevier, 2005 p. 160.
Chinese Application for Invention No. 201610202013.6—First Office Action dated Sep. 15, 2017.
Chinese Application for Utility Model No. 201490001542.4—First Office Action dated Sep. 27, 2017.
European Patent Application No. 16150283.6—Office Action dated Jan. 18, 2018.
Chinese Application for Utility Model No. 201490001542.4—Second Office Action dated Feb. 1, 2018.
Chinese Patent Application No. 201610011395.4—Second Office Action dated Feb. 14, 2018.
Guo Jialin etc., "Analysis on affecting factors of thermal cracking behavior of anodic oxide film on 6060 aluminum alloy", Materials Research and Application, vol. 5, No. 3, Sep. 2011, p. 229-232.
Chinese Application for Invention No. 201610202013.6—Second Office Action dated Apr. 11, 2018.
Chinese Patent Application No. 201610011395.4—Third Office Action dated Aug. 15, 2018.
Habazaki, H et al. Effects of Alloying Elements in Anodizing of Aluminium. Trans IMF, 1997, 75(1), 18-23. (Year 1997), 6 pages.
The Aluminum Association, Inc. International Alloy Designations and Chemical Composition Limits for Wrought Aluminum and Wrought Aluminum Alloys Jan. 2015. (Year: 2015), 38 pages.
Chinese Application for Invention No. 201610202013.6—Third Office Action dated Dec. 24, 2018.
Chinese Patent for Utility Model No. ZL201490001542.4—Utility Model Patent Evaluation Report (UMPER) dated Jan. 7, 2019.
Chinese Patent Application No. 201680050544.6—First Office Action dated Jan. 30, 2019.
Chinese Application for Invention No. 201610011395.4—Fourth Office Action dated Feb. 25, 2019.

* cited by examiner

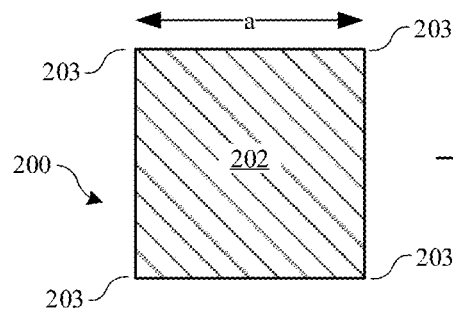
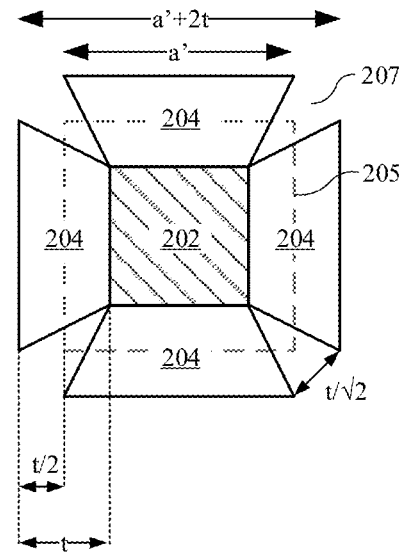
FIG. 2A
FIG. 2B
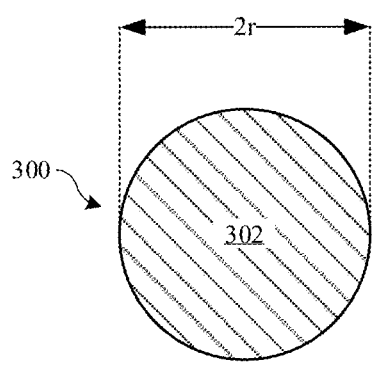
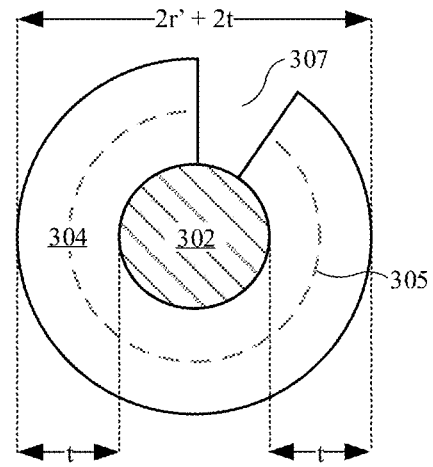
FIG. 3A
FIG. 3B

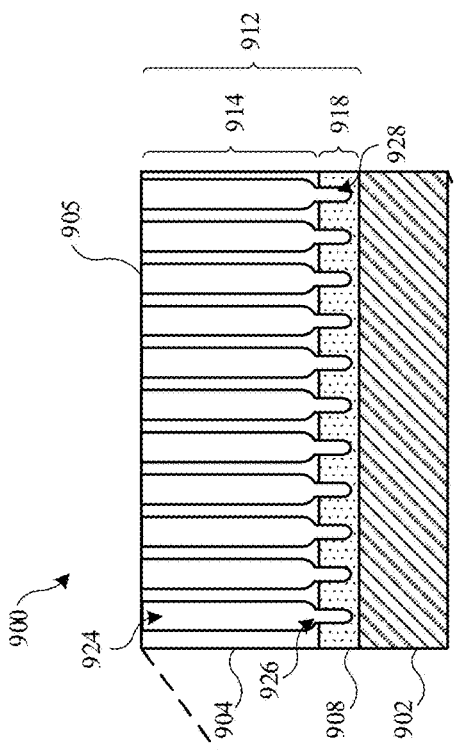
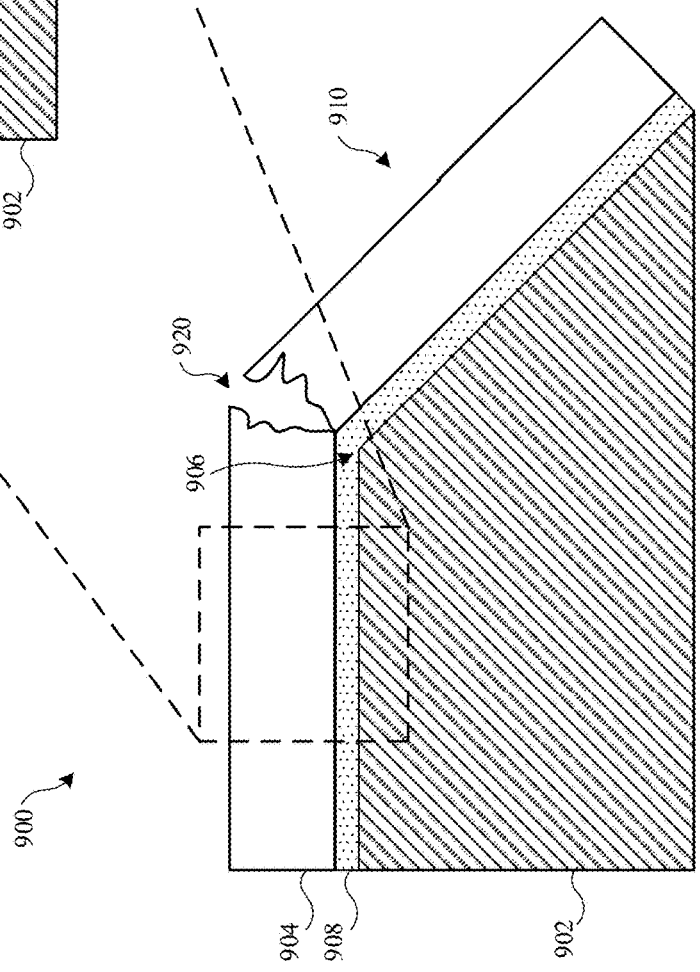
FIG. 9B
FIG. 9A

CORROSION RESISTANCE FOR ANODIZED PARTS HAVING CONVEX SURFACE FEATURES

CROSS REFERENCE TO RELATED APPLICATIONS

The present application claims the benefit of U.S. Provisional Application No. 62/729,346, entitled "CORROSION RESISTANCE FOR ANODIZED PARTS HAVING CONVEX SURFACE FEATURES," filed Sep. 10, 2018, the content of which is incorporated herein by reference in its entirety for all purposes.

This patent application is related and incorporates by reference in their entirety the copending U.S. patent application Ser. No. 15/881,305, entitled "OXIDE COATINGS FOR PROVIDING CORROSION RESISTANCE ON PARTS WITH EDGES AND CONVEX FEATURES," filed Jan. 26, 2018.

Any publications, patents, and patent applications referred to in the instant specification are herein incorporated by reference in their entireties for all purposes. To the extent that the publications, patents, or patent applications incorporated by reference contradict the disclosure contained in the instant specification, the instant specification is intended to supersede and/or take precedence over any such contradictory material.

FIELD

The described embodiments relate to oxide films and methods for forming the same. The oxide films can have layered structures that provide improved adhesion.

BACKGROUND

When a metal part having convex edges or protruding features is anodized, the resulting anodic oxide film can exhibit small cracks along the convex edges and protruding features. These cracks can compromise the protective nature of the oxide film by providing pathways for water or other corrosion-inducing agents to reach the underlying metal part, thereby leaving the metal part susceptible to corrosion.

Certain high-strength aluminum alloys suffer from poor oxide adhesion when anodized. Alloying elements such as zinc accumulate at the interface between the metal and the oxide, and when combined with sulfur from the anodizing electrolyte, the zinc weakens the adhesion of the oxide. Regions of the oxide coating thus chip off relatively easily when mechanical stress is applied through incidents such as surface impacts. These chips expose the substrate, compromising the protective nature of the oxide film by providing pathways for water or other corrosion-inducing agents to reach the underlying metal part, thereby leaving the metal part susceptible to corrosion. The chips also constitute obvious cosmetic defects. What are needed therefore are improved anodic oxide films and anodizing techniques.

SUMMARY

This paper describes various embodiments that relate to oxide coatings useful for coating and preventing corrosion of metal substrates, including substrates having convex surface features. In particular embodiments, the oxide coatings include a porous corrosion-prevention layer proximate to the substrate.

According to some embodiments, an enclosure for a portable electronic device is described. The enclosure includes a metal substrate having a surface that includes a surface feature, a first metal oxide layer that overlays the surface of the metal substrate, where the first metal oxide layer includes: a first set of pores that extend from an external surface of the enclosure and towards the metal substrate, and an interstice that is dependent upon the surface feature, where the interstice extends at least partially through the first oxide layer. The enclosure further includes a second metal oxide layer that is disposed between the metal substrate and the first metal oxide layer, where the second metal oxide layer includes a second set of pores having an average diameter that is less than the first set of pores.

According to some embodiments, an enclosure for a portable electronic device is described. The enclosure includes an aluminum alloy substrate including a convex surface feature, an anodized layer that overlays the aluminum alloy substrate. The anodized layer includes a first anodized layer including an interstice having a geometry that is based on the convex surface feature, the first anodized layer having a first thickness, and a second anodized layer that is disposed between the aluminum alloy substrate and the first anodized layer, where the second anodized layer has a second thickness that is less than the first thickness.

According to some embodiments, a method for forming an enclosure for a portable electronic device, the enclosure including a metal substrate having a surface feature, is described. The method includes converting a first amount of the metal substrate to a first metal oxide layer under a tensile strain condition that corresponds to a first electrical parameter, where the first metal oxide layer includes an interstice that is based on a geometry of the surface feature, and converting a second amount of the metal substrate to a second metal oxide layer under a compressive stress condition that corresponds to a second electrical parameter that is less than the first electrical parameter, where the second metal oxide layer is overlaid by the first metal oxide layer.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

FIGS. 2A-2B and 3A-3B illustrate cross-section views of parts having geometric features that are prone to corrosion.

FIGS. 9A-9C show cross-section views of a part having a corrosion-resistant oxide coating, in accordance with some embodiments.

DETAILED DESCRIPTION

Figure 1:
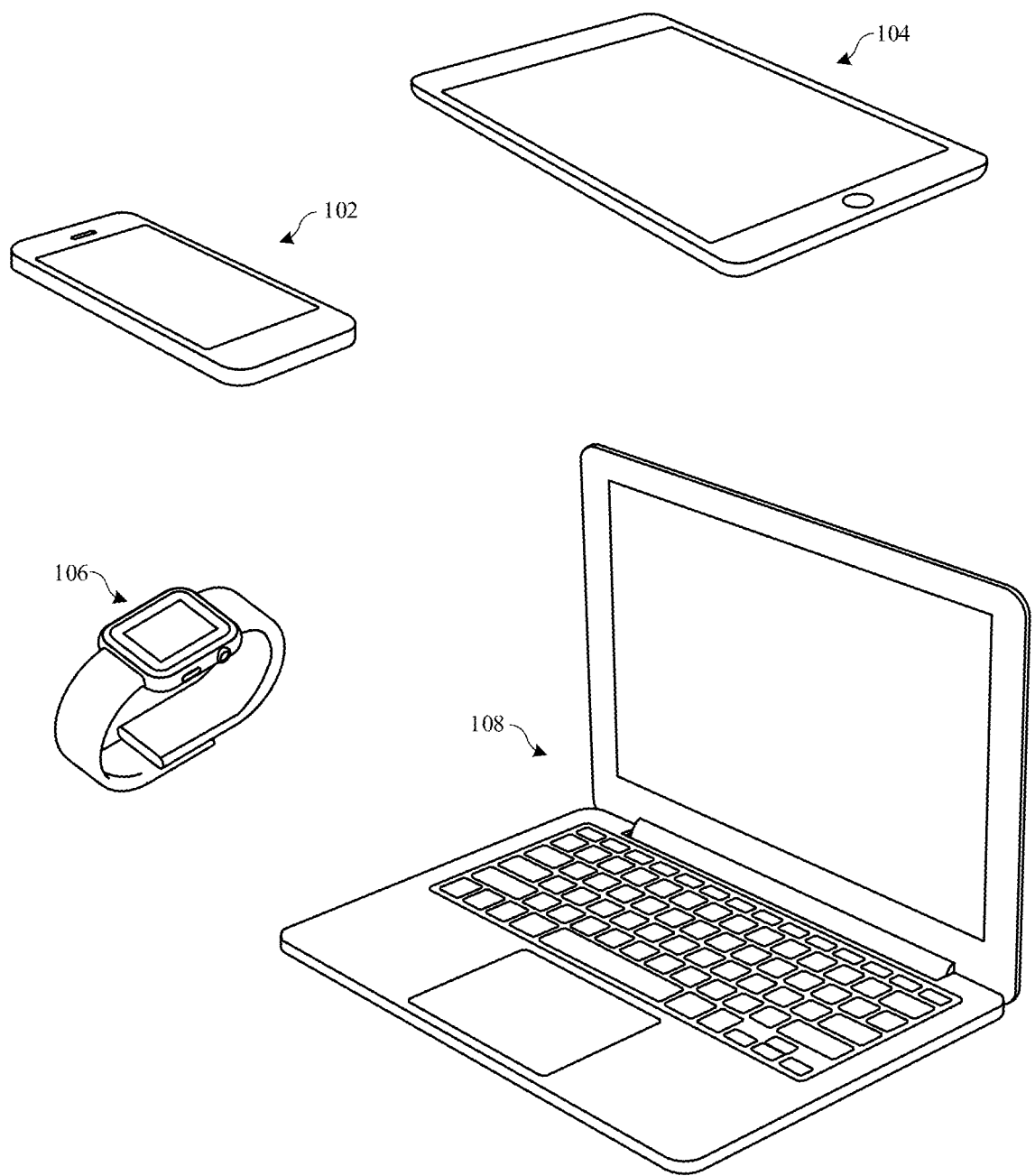
FIG. 1 shows perspective views of devices having metal surfaces that can be treated with the coatings described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Anodic oxide films that provide improved protection against corrosion for substrates having protruding features are described. The protruding features can include edges, corners, convex-shaped surfaces, and junction regions between non-parallel surfaces of a substrate. When a substrate having protruding features is anodized using conventional anodizing processes, the resulting oxide film can have cracks, interstices, gaps, or channels at areas covering the protruding features. This is because anodizing is a conversion process, whereby the oxide film is grown out of and into the substrate, resulting in an overall expansion of the outer surface of the oxide film. A protruding feature on the substrate generates an effective in-plane tensile strain in the oxide film during the anodizing process, which can cause cracks to form within the oxide film that compromise the protective nature of the oxide film.

The oxide films described herein include an inner oxide layer adjacent the substrate that is resistant to developing cracks, interstices, gaps, or channels during the anodizing process, even at high stress locations such as protruding features of the substrate. The inner oxide layer is formed under compressive stress conditions that counter the effective tensile strain induced by the protruding feature geometry. In this way, the inner oxide layer can form without cracks, interstices, gaps, or channels, thereby providing full coverage of the substrate and minimizing or eliminating corrosion. According to some embodiments, a thicker and harder outer oxide layer is formed over the inner oxide layer, thereby increasing the overall hardness of the oxide film.

According to some embodiments, methods for forming the oxide films include a two-phase anodizing process, with the second phase conducted using lower current density or lower voltage to generate the compressive stress conditions. For a feature having a given convex radius, the oxide films formed using the two-phase process show a far lower incidence of cracks, interstices, gaps, or channels compared to conventional oxide films.

As described herein, the term convex surface geometry can refer to a surface of a substrate (e.g., anodic oxide layer) that curves and extends outwards and away from a base portion of the same substrate. The convex surface geometry can include a radius of curvature, where cracks or convex surface geometry dependent interstices tend to form when the radius of curvature is greater than a threshold radius of curvature. In other words, the convex surface geometry can appear "more convex" when there is an increase in the radius of curvature and/or a greater change in the radius of curvature; thereby, increasing a tendency of the substrate to form cracks and channels. Additionally, these cracks and interstices are more likely to form in the surface of the substrate when the surface is subject to tensile strain, such as during an anodization process. For example, during the anodization process, the radius of curvature of a surface of the anodic oxide layer is necessarily greater than a radius of curvature of the underlying substrate that was oxidized, which can induce lateral expansion of the anodic oxide layer. In other examples, these cracks and interstices can tend to form when the radius of curvature is less than 0.5 mm.

In some examples, the convex surface geometry can include surfaces (e.g., planar surfaces) that meet at an edge, where the edge can represent an abrupt change in the radius of curvature and represent a focal point for the formation of the interstice or the crack. In such some examples, the convex surface geometry can include an angle associated with where the planar surfaces meet. Cracks, fissures, and interstices that are dependent upon the convex surface geometry may tend to form when the angle at which the planar surfaces meet is less than a threshold angle. In other words, there is a greater tendency to form cracks, interstices, and channels when the angle between the surfaces is more acute (i.e., less than 90 degrees). In some examples, an acute angle between multiple surfaces may correspond to a sharp edge or a sharp protruding feature, and where further decreasing the acute angle between these multiple surfaces can lead to a sharper edge or a sharper protruding feature. In some examples, the sharpness of the edge or protruding feature can be based on the acute angle and/or the thickness of the surfaces.

As described herein, the terms oxide, anodic oxide, metal oxide, etc. can be used interchangeably and can refer to suitable metal oxide materials, unless otherwise specified. Furthermore, the terms coating, layer, film, etc. can be used interchangeably and can refer to any suitable material that covers a surface of a substrate, part, etc. unless otherwise specified. For example, an oxide formed by anodizing an aluminum or aluminum alloy substrate can form a corresponding aluminum oxide film, layer or coating.

The oxide coatings described herein are well suited for providing cosmetically appealing and protective surfaces to consumer products. For example, the oxide coatings can be used to form durable and cosmetically appealing finishes for housing of computers, portable electronic devices, wearable electronic devices, and electronic device accessories, such as those manufactured by Apple Inc., based in Cupertino, Calif.

These and other embodiments are discussed below with reference to FIGS. 1-13. However, those skilled in the art will readily appreciate that the detailed description given herein with respect to these Figures is for explanatory purposes only and should not be construed as limiting.

The methods described herein can be used to form durable and cosmetically appealing coatings for metallic surfaces of consumer electronic products, such as computing devices shown in FIG. 1, which includes portable phone 102, tablet computer 104, smart watch 106 and portable computer 108.

It is well understood that the use of personally identifiable information that is capable of being transmitted, received, and/or managed by these consumer electronic devices should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. Electronic devices 102, 104, 106 and 108 can each include housings that are made of metal or have metal sections. Aluminum alloys and other anodizable metals and their alloys can be used due to their ability to anodize and form a protective anodic oxide coating that protects the metal surfaces from scratches. Aluminum alloys, such as 5000 series, 6000 series or 7000 series aluminum alloys, may be choice metal materials due to their light weight and durability.

Products such as electronic devices 102, 104, 106 and 108 can include metal edges, corners and other geometric features that can be susceptible to corrosion and developing cosmetic defects when anodized using conventional techniques. This is, in part, because anodizing is a conversion process that consumes surface portions of a part. To illustrate, FIGS. 2A-2B and 3A-3B show cross-section views of parts, which are treated using a conventional anodizing process.

FIG. 2A shows part 200, which includes metal substrate 202 having a square shape with corners 203 and side defined by length a. FIG. 2B shows metal substrate 202 after a conventional anodizing process, where the metal substrate has a reduced length a'. Anodizing is a conversion process, whereby a portion of metal substrate 202 is consumed and converted to a corresponding oxide film 204 having thickness t. Dashed line 205 indicates the dimensions of the original surface of metal substrate 202 prior to the anodizing process. As shown, oxide film 204 grows into and out from the original surface of the metal substrate 202 by about t/2, and increases the length of part 300 to about a'+2t. This inherent expansion from the anodizing process induces tensile strain on oxide film 204. Since anodizing converts metal substrate 202 to a lower density porous oxide film 204, the inherent expansion which might be expected to accommodate some of this effective strain. However, this is balanced by mass loss (e.g., aluminum dissolving into the anodizing solution) and is largely expressed in an out-of-plane direction. Thus, those portions of oxide film 204 on corners 203 can experience significant in-plane tensile strain that causes channels 207 to form during the anodizing process. The likelihood of forming cracks or interstices and the width of channels 207 are functions of the angle of corners 203, with more acute angles associated with a higher likelihood of forming channels 207 and wider channels 207. In particular, the angle of corners can refer to convex surface geometrical features that refer to a portion of the oxide film 204 that protrudes or extends away from the oxide film 204. In other words, every internal angle of the convex surface geometrical features is less than or equal to 180 degrees. The angle of corners can refer to multiple surfaces that intersect or meet at a point. As the angle of the corner decreases (i.e., becomes more acute), then the corner becomes sharper and the amount of tensile strain induced at the oxide film 204 is increased. Consequently, increasing the amount of tensile strain at the oxide film 204 can cause channels 207 to form at the focal point where the multiple surfaces intersect. The likelihood of forming channels 207 and the width of the channels 207 can also depend on the thickness t of oxide film 204, with greater thicknesses associated with a higher likelihood of cracking or forming interstices, and with the width of channel 207 can be calculated at about $t/\sqrt{2}$.

FIG. 3A shows part 300, which includes metal substrate 302 having a radius r and a round shape defined by diameter 2r and circumference $2\pi r$. FIG. 3B shows metal substrate 302 after a conventional anodizing process, whereby a portion of metal substrate 302 is consumed and converted to a corresponding oxide film 304 having thickness t. Subsequent to the anodization process, the metal substrate 302 has a reduced radius r'. Dashed line 305 indicates the dimensions of the original surface of metal substrate 302 prior to the anodizing process. Oxide film 304 grows into and out from original surface of the metal substrate 302 and expands the diameter of part 300 to about 2r'+2t and expands the outer circumference of part 300 to about a (r'+t), which induces tensile strain on oxide film 304 that causes channel 307 to form. The likelihood of cracking or forming channels and the width of channel 307 are functions of the radius of curvature of substrate 302, with smaller radius of curvatures associated with a higher likelihood of cracking and forming channels, and forming a wider channel 307. The likelihood of forming channels and the width of the channels 307 are functions of the radius of curvature. In particular, the radius of curvature of the oxide film 304 can refer to convex surface geometrical features (e.g., external surface features) that protrude or extend away from a base portion (e.g., inner surface) of the oxide film 304. In other words, the inner surfaces of the oxide film 304 are convex because the distance between two or more points of the oxide film 304 is the length of the shortest arc connecting them. As the radius of curvature increases and/or there is a greater increase in the amount of change in the radius of curvature, can result in an increase the tendency of the oxide film 304 to form channels 307. Additionally, during the anodization process, the oxide film 304 necessarily has a greater radius of curvature than the underlying substrate 302. Therefore, the anodization process can lead to increased lateral expansion of the oxide film 304, which can lead to formation of channels 307. The likelihood of cracking and forming channels, and the width of channel 307 can also depend on the thickness t of oxide film 304, with greater thicknesses associated with a higher likelihood of cracking and a wider channel 307.

Figure 4A:
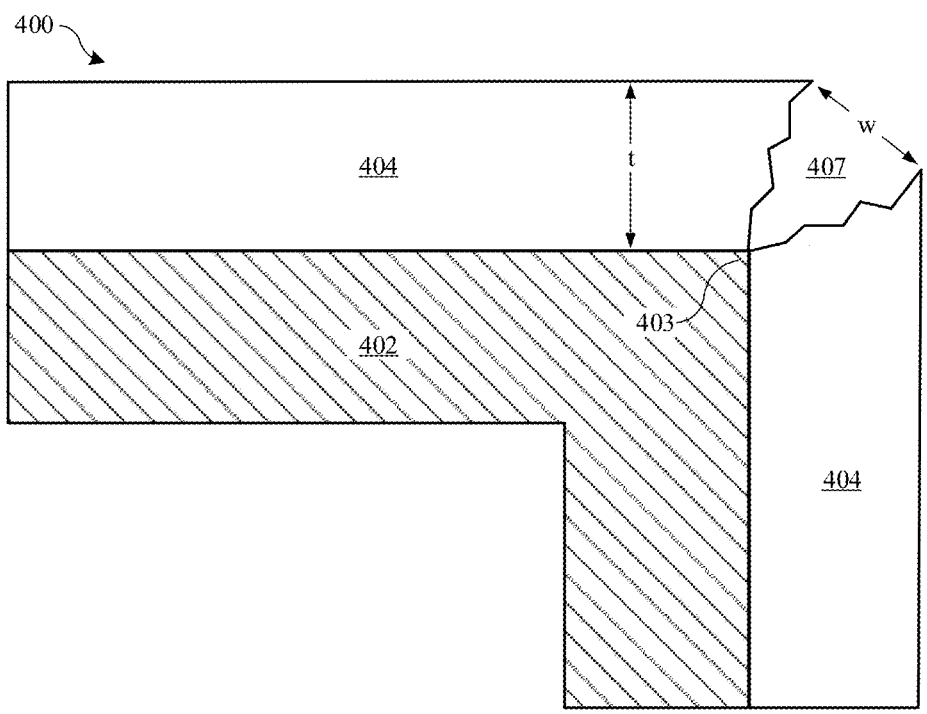
FIGS. 4A and 4B illustrate cross-section views of enclosures having geometric features that are prone to corrosion.
Figure 4B:
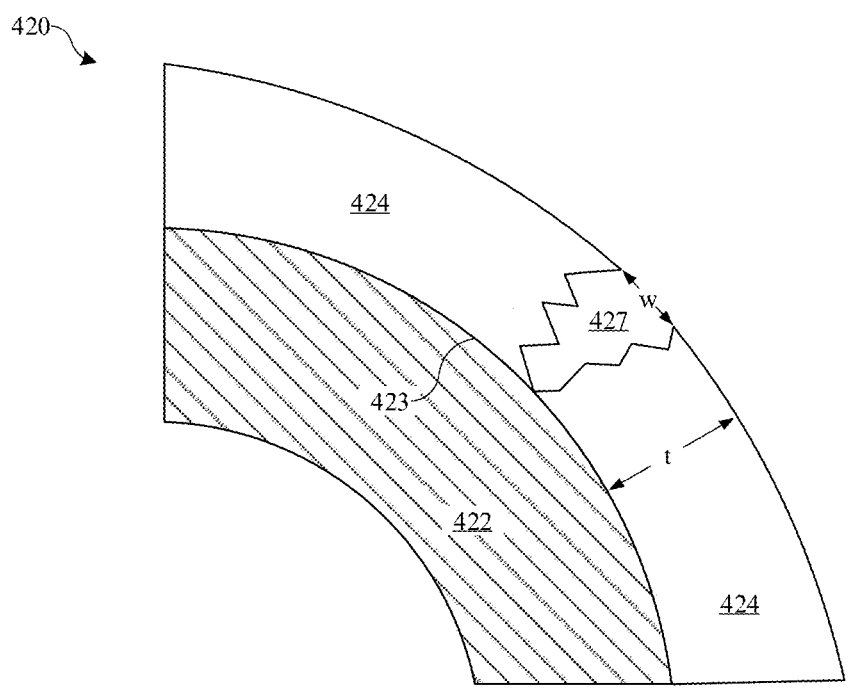

FIGS. 4A and 4B illustrate cross-section views of enclosures having geometric features that, when anodized using convention processes, can cause channels to form within the resultant oxide film. FIG. 4A shows enclosure 400, which includes metal substrate 402 having edge 403. The geometric constraints of edge 403 induce tensile stress within oxide coating 404 during the anodizing process, thereby causing channel 407 to form—similar to as described above with reference to FIGS. 2A-2B and 3A-3B. The size (e.g., as measured by width w) of channel 407 will depend, in part, on the acuteness of edge 403 and thickness t of oxide coating 404. In some cases, width w of channel can range between about 10 micrometers to about 800 micrometers.

Although channel 407 may in some cases be too small to be visible, channel 407 can act as a pathway for water, other corrosion-inducing agents, or other contaminant to reach underlying substrate 402, thereby compromising the protective nature of oxide coating 404. In some products, smaller channel 407 may not lead to significant corrosion of the underlying substrate 402. Furthermore, the product may not be exposed to moisture on a regular basis during normal use. However, some products, such as some portable electronic devices, may be exposed to more aggressively corrosive environments, such as exposure to sweat, humid conditions, and chlorides from chlorinated or ocean water, which can exacerbate the corrosion process and lead to significant corrosion of substrate 402.

Furthermore, some types of metal substrates may be more susceptible to corrosion. For example, some aluminum alloys that include relatively high levels of zinc may be more susceptible to corrosion than other aluminum alloys under certain conditions. In general, zinc can be added as an alloying element to increase the strength and hardness of an aluminum alloy. For example, some 7000-series aluminum alloys (per The International Alloy Designation System), which are known for their high strength, can have relatively high levels of zinc. In some applications, the target yield strength for substrate 402 is at least about 330 MPa. In some cases, this corresponds to an aluminum alloy having a zinc concentration of at least about 4 weight %. In other cases, this corresponds to an aluminum alloy having a zinc concentration of at least about 2 weight %. It is believed that zinc combines with magnesium as another alloying element to form precipitates such as $MgZn_2$ (the η' or "eta-prime" phase), which gives the aluminum alloy its high strength. Thus, the aluminum alloys having relatively high levels of zinc may also have relatively high levels of magnesium. Despite the advantage of increasing the strength of the substrate, higher levels of zinc can also be associated with increased vulnerability to corrosion. Thus, the presence of channel 407 can be especially detrimental to those substrates 402 composed of aluminum alloys having zinc concentrations of about 4 weight % or higher.

It should be noted that width w of channel 407 can be on the order of micrometers, and is therefore generally three to four orders of magnitude greater than diameters of the pores formed within oxide coating 404 during the anodizing process, which are typically in the scale of tens of nanometers. Thus, a subsequent hydrothermal sealing process would not be able to sufficiently close off channel 407.

It should also be noted that a polymer coating applied over oxide coating 404 and into channel 407 used mitigate corrosion can detract from the tactile and visible cosmetics of oxide coating. In particular, a polymer coating may have a warm and sticky feeling compared to a cool and smooth feeling of an outer oxide coating. Furthermore, polymer coatings may introduce their own reliability limits, such as increased changes of discoloration under ultraviolet light exposure, or attack by certain everyday household chemicals.

FIG. 4B shows enclosure 420, which includes metal substrate 422 having a curved surface 423, which can correspond to a curved edge, a curved corner, or a curved protruding feature of enclosure 420. Oxide coating 424 formed using a conventional anodizing process includes channel 427. As described above with reference to FIG. 4A, channel 427 can act as a pathway for corrosion-inducing agents to reach metal substrate 422. Width w of channel 427 will depend, in part, on the radius of curvature of curved surface 423 and thickness t of oxide coating 424. For example, in some cases, radius of curvatures of about 0.5 mm or smaller for oxide coating 424 having thickness t of about 8 micrometers or greater can cause channel 427 to form. In some applications, thicknesses t of about 12 micrometers or greater may be preferred for adequate corrosion protection of some types of aluminum alloys. Thus, such oxide coatings would likely develop channels along convex geometrical surfaces or convex protruding features.

Figure 5A:
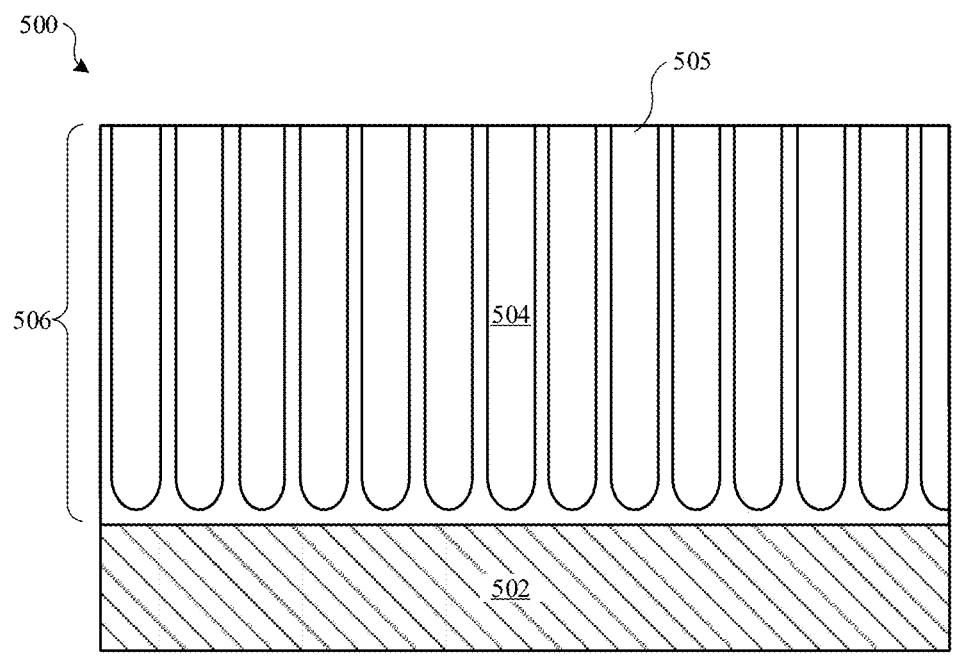
FIGS. 5A and 5B show cross-section views of a part undergoing anodizing processes for forming a corrosion-resisting oxide coating, in accordance with some embodiments.
Figure 5B:
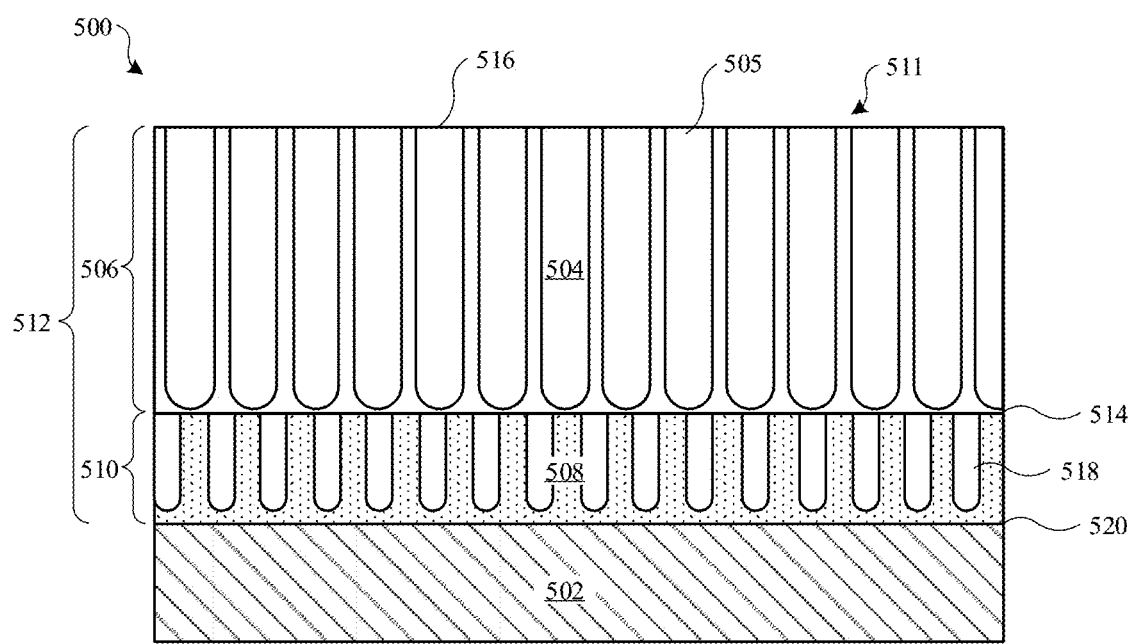

Described herein are anodizing methods for forming an oxide coating that provides improved corrosion resistance, especially useful on parts with edges, corners and convex features. Even a coarse blast texture, or a surface roughened through a laser marking or engraving procedure could result in such features. FIGS. 5A and 5B show cross-section views of part 500 undergoing an anodizing process in accordance with some embodiments. At FIG. 5A, metal substrate 502 of part 500 has undergone a first anodizing process, whereby a portion of substrate 502 is converted to first oxide layer 504. In some embodiments, substrate 502 corresponds to a metal portion of an enclosure of an electronic device, such as device 102, 104, 106 or 108, described above. Substrate 502 can be composed of any suitable anodizable material, including aluminum and aluminum alloys. In some embodiments, substrate 502 is composed of high-strength aluminum alloy, such as those having relatively high levels of zinc as an alloying element. As described above, higher concentrations of zinc and/or magnesium can be associated with greater yield strength and hardness. In some embodiments, substrate 502 is composed of an aluminum alloy having a zinc concentration of at least about 4 weight %. In some embodiments, substrate 502 is composed of an aluminum alloy having a zinc concentration of at least about 2 weight %. In some embodiments, substrate 502 is composed of an aluminum alloy having a magnesium concentration of at least about 2 weight %. In some embodiments, substrate 502 is composed of an aluminum alloy having a magnesium concentration of at least about 1 weight %. In some applications, substrate 502 has a yield strength of at least about 330 MPa.

Another consideration regarding substrate 502 relates to the cosmetics. Color and finish quality can be important aspects when manufacturing consumer products. Some alloying elements, such as iron, copper, and silver, within substrate 502 can discolor first oxide layer 504. For example, copper can add a yellow color to the first oxide layer 504, which can be noticeable even when copper is added in quantities as low as about 0.2 weight %. Thus, in some embodiments, where such yellowing in first oxide layer 504 is undesirable, substrate 502 is composed of an aluminum alloy having a copper concentration of no more than about 0.2 weight %—in some embodiments, a copper concentration of no more than about 0.1 weight %. These and other details as to how alloying elements can affect strength and coloration of substrate 502 are described in U.S. patent application Ser. Nos. 14/830,699 and 14/830,705, both filed on Aug. 19, 2015, and U.S. patent application Ser. No. 14/927,225, filed on Oct. 29, 2015, each of which is incorporated herein in its entirety for all purposes.

Any suitable anodizing process can be used to form first oxide layer 504. In some embodiments, a "Type II anodizing" process (as defined by military specification MIL-A-8625 standards) is used, which involves anodizing in an aqueous sulfuric acid-based electrolyte. In some embodiments, the Type II anodizing process involves using an applied current density of between about 1 $A/dm^2$ and about 2 $A/dm^2$. In a particular embodiment, the applied current density is no less than about 1.3 $A/dm^2$. In some embodiments, the Type II anodizing involves using an electrolyte temperature of between about 15 degrees C. and about 25 degrees C. It should be noted that anodizing processes using other types of electrolytes might be used, including those using oxalic acid-based electrolytes or phosphoric acid-based electrolytes. However, sulfuric acid-based electrolytes can provide porous (and therefore dyeable), relatively colorless, and relatively durable coatings, which can be desirable characteristics for consumer products, such as electronic devices 102, 104, 106 and 108 described above.

First oxide layer 504 is porous in that it includes pores 505, which are formed during the anodizing process and which can be filled with colorant in a subsequent anodic film coloring operation. The size of pores 505 within first oxide layer 504 will vary depending on the anodizing process conditions. In some embodiments, pores 505 have diameters ranging between about 10 nanometers and about 50 nanometers. The thickness 506 of first oxide layer 504 can vary, depending on application requirements. In some consumer electronic enclosure applications, thickness 506 should be sufficiently large to provide adequate protection to substrate 502 against denting and scratching under normal use, and sufficiently small such that first oxide layer 504 remains cosmetically appealing and relatively colorless. In some embodiments, this corresponds to thickness 506 ranging between about 10 micrometers and about 50 micrometers. In some embodiments, this corresponds to thickness 506 ranging between about 10 micrometers and about 20 micrometers FIG. 5B shows part 500 after a second anodizing process is performed, whereby another portion of substrate 502 is converted to second oxide layer 508, having a thickness 510. Because of their relative positions, second oxide layer 508 can be referred to as an inner oxide layer and first oxide layer can be referred to as an outer oxide layer. Together, first oxide layer 504 and second oxide layer 508 can be referred to as oxide coating 511, having a thickness 512 (thickness 506 plus thickness 510).

The second anodizing process is different than the first anodizing process used to form first oxide layer 504, in that the second anodizing process involves growing second oxide layer 504 under compressive stress conditions compared to tensile stress conditions of the first anodizing process. As described above with reference to FIGS. 2A-2B, 3A-3B and 4A-4B, oxide films grown under tensile stress can form interstices, cracks or channels, especially in those regions of a substrate that include high strain regions such as edges, corners and convex-shaped features. The second anodizing process involves adjusting anodizing parameters such that second oxide layer 508 experiences a compressive stress during its formation, so that it can tolerate a higher level of strain during its formation. Thus, second oxide layer 508 is less likely to develop channels compared to first oxide layer 504, even at high strain regions of a part, such as edges, corners, convex-shaped protrusions, or textured or roughened surfaces which exhibit sufficiently small radius of curvature or acute angles where different surfaces meet at an edge. This means that even if first oxide layer 504 has channels formed during the first anodizing process, second oxide layer 508 can remain crack-free or interstice-free and therefore protect substrate 502 from exposure to water, other corrosion-inducing agents, or other contaminant. These aspects will be described in detail below with reference to FIGS. 6A-6D.

Process conditions of the second anodizing process can vary. In some embodiments, the second anodizing process involves keeping part 500 in the same electrolyte as used during the first anodizing process, and reducing the current density compared to that used during the first anodizing process. One of the advantages of keeping part 500 in the same electrolyte during the first and second anodizing processes is that this simplifies manufacturing. In particular embodiments, the first and second anodizing processes are both performed in an aqueous sulfuric acid electrolyte (e.g., a 200 g/l solution at 25 degrees C.) and the current density is reduced by a factor of four (e.g., from about 1.6 A/dm$^2$ to about 0.4 A/dm$^2$), corresponding to a reduction in voltage of about one half (½). In some embodiments, the second anodizing process involves using a current density ranging less than about 0.8 A/dm$^2$. In a particular embodiment, the second anodizing process involves using a current density ranging between about 0.2 A/dm$^2$ and about 0.9 A/dm$^2$. In another embodiment, the second anodizing process involves using a voltage ranging between about 6 volts and about 10 volts. In some embodiments, using a higher electrolyte temperature drops the effective voltage, thereby inducing a compressive stress conditions during the second anodizing process. In another variation, the current density (or voltage) is dropped as a continuous gradient and ends at a target low current density (or voltage) rather than abruptly dropped in one step.

Due to the different anodizing conditions, second oxide layer 508 has different structural properties than first oxide layer 504. The structural difference, which can be key to the present embodiments, is the stress during layer formation, with the second layer being formed under compressive stress. In particular, pores 518 within second oxide layer 508 are generally smaller in diameter compared to pores 505 of first oxide layer 504. In some embodiments, the diameters of pores 518 of second oxide layer 508 are about half (½) the diameters of pores 505 of first oxide layer 504. Thus, a first pore in the first oxide layer 504 can have a first diameter that is greater than that of a pore in the second oxide layer 508 (e.g., the second diameter can be at least half the first diameter).

An undesirable consequence of anodizing conditions selected to induce compressive stress in the second oxide layer 508 (namely lower current density, lower voltage or higher electrolyte temperature) can be that reductive dissolution is greater. It can be a relatively "soft" anodizing process, which results in softer oxide films. This softening particularly affects outer surface 516, and the outer portion of the first oxide layer 504, making the overall film less abrasion resistant. Thus, for those applications where the oxide coating hardness should be sufficiently high to resist scratching and denting, the relatively "hard" process used to grow the first oxide layer 504 should constitute as much of the overall processing time as possible. The corresponding layer thickness 506 of first oxide layer 504 will be much greater than the layer thickness 510 of the second oxide layer 508. For example, in some consumer electronic enclosure applications where the oxide coating hardness should be sufficiently high to resist scratching and denting, the harder first oxide layer 504 should have a much greater thickness 506 compared to thickness 510 of the softer second oxide layer 508. For example, in some consumer electronic enclosure applications, oxide coating 511 should have a hardness of at least about 250 $HV_{0.05}$ as measured in accordance with Vickers hardness testing standards—in some embodiments at least about 300 $HV_{0.05}$. In some embodiments, thickness 510 of second oxide layer ranges between about 2% and about 15% of the thickness of oxide coating 511. In some embodiments, second oxide layer 508 has a thickness no greater than about 2 micrometers. In some consumer product applications, thickness 512 of oxide coating 511 should be at least about 8 micrometers in order to provide adequate protection to substrate 502, but not be so thick as to negatively affect the cosmetics of part 500. In particular embodiments, thickness 512 ranges between about 8 micrometers and about 30 micrometers. In a particular embodiment, thickness 512 ranges between about 10 micrometers and about 15 micrometers.

In addition to being generally crack-free or interstice-free due to the compressive stress conditions of the second anodizing process, the presence of second oxide layer 508 can provide other advantages. For example, second oxide layer 508 can better adhere to substrate 502 compared to first oxide layer 504 due to the compressive stress conditions from which second oxide layer 508 was formed. This means that oxide coating 511 can be less susceptible to delamination compared to an oxide coating having only first oxide layer 504. Thus, part 500 would be less susceptible to chipping or delamination that would cause cosmetic defects and also leave those chipped or delaminated areas of substrate 502 exposed and vulnerable to corrosion.

Another way in which second oxide layer 508 can provide structural advantages to oxide coating 511 relates to interface 514 between first oxide layer 504 and second oxide layer 508. In particular, oxide coating 511 may be subjected to forces that impact outer surface 516 during use of part 500, such as from scratching, gouging or drop events, which can cause damage in the form of channels within oxide coating 511. If these post-anodizing channels occur, they may propagate through first oxide layer 504 and be deflected in a lateral direction (generally parallel to outer surface 516) by interface 514, thereby preventing such channels from propagating through second layer oxide layer 508. It should be noted that this type of channel occurs during the use of part 500 (i.e., after oxide coating 511 has already been formed), whereas channels 207 and 407 described above with reference to FIGS. 2A-2B, 3A-3B and 4A-4B occur during the anodizing process. In this way, second oxide layer 508 can provide protection against post-anodizing channels. It should be noted that, in some embodiments, thickness 510 of second oxide layer 508 is at least a prescribed minimum thickness in order to prevent or reduce the likelihood of such post-anodizing channels. In some embodiments, this minimum thickness is about 0.5 micrometers. Thus, in some embodiments, thickness 510 ranges between about 0.5 micrometers and about 2 micrometers.

In particular, the presently described two-step anodizing process provides a means of improving the interfacial adhesion between an anodic oxide coating and relatively pure 7000-series aluminum alloys comprising zinc. For instance, specific types of aluminum alloys (e.g., aluminum-zinc alloys, aluminum-magnesium alloys, etc.) can be susceptible to delamination when anodized using a conventional Type II anodizing process. In particular, specific types of electrolytes, such as sulfuric acid, can include chemical species (e.g., sulfur) that preferentially combine with alloying agents (e.g., zinc) to form delamination compounds that can promote delamination between the oxide coating 511 and the substrate 502. In order to minimize the possibility of delamination of these parts during the anodization process, other types of acids, such as oxalic acid and mixed acids can be generally used. However, these types of acids are associated with certain drawbacks, such as a higher probability of discoloring these parts with a yellow appearance during the anodization process. Consequently, the discoloration of these anodized parts is cosmetically unappealing.

Beneficially, the techniques described herein are able to improve interfacial adhesion between the oxide coating 511 and the substrate 502 relative to the conventional Type II anodizing process, such that these parts can be anodized using electrolytes, such as sulfuric acid, which were previously avoided due to their strong likelihood of inducing delamination. Additionally, by anodizing these parts using these types of electrolytes, discoloration of these parts can be generally avoided.

According to some embodiments, interfacial adhesion between the oxide coating 511 and the substrate 502 can be improved by subjecting the part 500 to a two-step anodizing process, where first and second steps for forming the first metal oxide coating 504 and the second metal oxide coating 508 are performed under different electrical parameter conditions (e.g., current density, voltage, etc.). Furthermore, in some embodiments, the first and second metal oxide coatings 504, 508 can be formed by exposing the part 500 to the same electrolytic solution during the first and second anodizing processes. For example, the second anodizing process can include exposing the part 500 to the same electrolytic solution that the part 500 was previously exposed to during the first anodizing process. In other words, the part 500 does not need to be removed from the electrolytic solution in-between the first and second anodizing processes. In other embodiments, the first and second metal oxide coatings 504, 508 can be formed by exposing the part 500 to a substantially similar electrolyte. According to some examples, the electrolytic solution that is used to anodize the part 500 during the first and second anodizing processes can include one of sulfuric acid, phosphoric acid, or chromic acid.

While the first anodizing process can be performed at a relatively high current density (or voltage), such as between about 1 A/dm$^2$ to about 2 A/dm$^2$, the second anodizing process can be performed at a lower current density (or voltage), such as 1 A/dm$^2$ or less. In other examples, the second anodizing process can be performed at a current density between about 0.2 A/dm$^2$ to about 0.9 A/dm$^2$. In particular, implementing a lower current density (or voltage) during the second anodizing process can impart compressive stress conditions against the part 500. Beneficially, by imparting compressive stress conditions, the second metal oxide layer 508 that is formed as a result of the second anodizing process is able to tolerate a higher level of strain, thereby significantly minimizing and/or preventing the likelihood of delamination between the oxide coating 511 and the substrate 502, as will be described in greater detail herein.

According to some embodiments, the minimized delamination and/or prevention of delamination as a result of performing the second anodizing process under reduced electrical parameter conditions (e.g., current density, voltage, etc.) can be attributed to the presence of fewer alloying agents, such as zinc, that aggregate and become enriched at an interface 520 between the substrate 502 and the second metal oxide layer 508 during the second anodizing process. Specifically, it has been found that particular alloying agents, such as zinc can combine with one or more chemical species included within the electrolytic solution to form delaminating compounds that can weaken the interfacial adhesion between the oxide coating 511 and the substrate 502 at the interface 520. In particular, the formation of delamination compounds can cause the oxide coating 511 to be susceptible to delamination (e.g., chipping, spalling, peeling, etc.), such as when the part 500 is subject to a high-impact event. In some examples, the alloying agents, such as zinc from the aluminum alloy substrate can act as an interface-weakening agent when the zinc becomes enriched at the interface 520. The zinc can aggregate at the interface 520 and form a thin layer of zinc. The enriched zinc layer can preferentially combine with sulfur-containing species, such as from a sulfuric acid electrolyte, thereby forming one or more zinc-sulfur species, such as zinc folate or a zinc sulfite. Consequently, these one or more zinc-sulfur species can act as delaminating compounds or interface-weakening agents that disrupt the interface adhesion between the oxide coating 511 and the substrate 502. However, it has been found that the enrichment of zinc at the interface 520 can be minimized and/or prevented by lowering the current density (or voltage) of the second anodizing process relative to the first anodizing process, such as 0.6 A/dm$^2$ or less. Instead zinc can become more readily incorporated directly into the second metal oxide layer 508 so as to prevent zinc from aggregating at the interface 520.

In some examples, traditionally, sulfur from the sulfuric acid electrolyte can also accumulate at the interface 520 and combine with the alloying agents so as to weaken the interface adhesion between the oxide coating 511 and the substrate 502 at the interface 520. However, by performing the second anodizing process at a relatively low current density (or voltage) can also minimize the presence of sulfur elements at the interface 520. In particular, the sulfur elements can be locked within the second metal oxide layer 508 and less driven towards the interface 520. Beneficially, this reduction of sulfur elements at the interface 520 can prevent and/or minimize zinc-sulfur compounds from interacting with the alloying agents.

According to some embodiments, the second metal oxide layer 508 formed by the techniques described herein can be characterized as having different structural properties than the first metal oxide layer 504. This difference in structural properties can be attributed to forming the second metal oxide layer 508 under compressive stress conditions while forming the first metal oxide layer 504 under tensile strain conditions. In some examples, the pores 518 within the second metal oxide layer 508 are generally smaller in diameter than pores 505 within the first metal oxide layer 504. In some examples, the pores 518 of the second metal oxide layer 508 have pore diameters that are about half of the pore diameters of the pores 505 of the first metal oxide layer 504.

The methods described herein may be used in combination with the afore-mentioned patent publications, to yield further improvement in interfacial adhesion by a factor of two or more, without additional discoloration.

Additionally, adhesion between the oxide coating 511 and the substrate 502 can be measured using a 5-by-5 pattern of corner-linked 10 kg Vickers indents (as described in U.S. Patent publication No. 2016/0290917 A1, entitled "PROCESS FOR EVALUATION OF DELAMINATION-RESISTANCE OF HARD COATINGS ON METAL SUBSTRATES," published Oct. 6, 2016, which is incorporated by reference in its entirety for all purposes) yields fewer than 5 vertices of delamination—as compared to an unacceptable level of delamination (e.g., greater than 15 vertices of delamination) observed when the same alloy is anodized in the same electrolyte (e.g., 200 g/l sulfuric acid) without the presently described two-step process.

Other methods identified for overcoming such interfacial adhesion problems include micro-alloying with elements such as copper and silver (as described in U.S. Patent publication No. 2017/0051426 A1, entitled "PROCESSES TO AVOID ANODIC OXIDE DELAMINATION OF ANODIZED HIGH STRENGTH ALUMINUM ALLOYS," published Feb. 23, 2017, which is incorporated by reference in its entirety for all purposes), anodizing in electrolytes comprising organic acids (such as described in U.S. Patent publication No. 2016/0060783 A1, entitled "PROCESS TO MITIGATE SPALLATION OF ANODIC OXIDE COATINGS FROM HIGH STRENGTH SUBSTRATE ALLOYS," published Mar. 3, 2016, and U.S. Patent publication No. 2016/0289858 A1, entitled "PROCESS TO MITIGATE GRAIN TEXTURE DIFFERENTIAL GROWTH RATES IN MIRROR-FINISH ANODIZED ALUMINUM," published Oct. 6, 2016, which are incorporated by reference in their entireties for all purposes). However, these methods can result in some degree of discoloration (e.g., yellowness) in the resulting oxide film.

As described above, discoloration of part 500 can be an important factor for consumer product applications. The degree of discoloration can be measured using colorimetry spectrophotometer techniques and quantified according to color space standards, such as CIE 1976 L*a*b* by the International Commission on Illumination. The CIE 1976 L*a*b* color space model is used to characterize colors of an object according to color opponents L* corresponding to an amount of lightness, a* corresponding to amounts of green and magenta, and b* corresponding to amounts of blue and yellow. By convention, higher L* values correspond to greater amounts of lightness and lower L* values correspond to lesser amounts of lightness. Negative b* values indicate a blue color, with more negative b* values indicating a bluer color, and positive b* values indicate a yellow color, with more positive b* values indicating a yellower color.

Anodic oxide coatings characterized as having b* values greater than about 1 will generally have a perceptibly yellow color. The presence of too much copper or other certain types of alloying elements within a substrate and cause part 500 to have b* values greater than 1 when oxide coating 511 is more than about five micrometers in thickness. Since a yellow color is undesirable in some applications, in some embodiments, oxide coating 511 is characterized having a b* value of less than 1. In some embodiments, oxide coating 511 is characterized having a b* value between about 1 and −1 and a* value between about 1 and −1, corresponding to a substantially colorless oxide coating 511 when undyed.

After the second anodizing process is complete, any suitable post-anodizing process can be implemented, such as an anodic film dyeing process, hydrothermal sealing process, and/or anodic film buffing/polishing process. In some applications, oxide coating 511 is left undyed and substantially colorless and hydrothermally sealed. In other applications, oxide coating 511 is colorized by depositing dye and/or metal within pores 505, and then hydrothermally sealed.

Figure 6A:
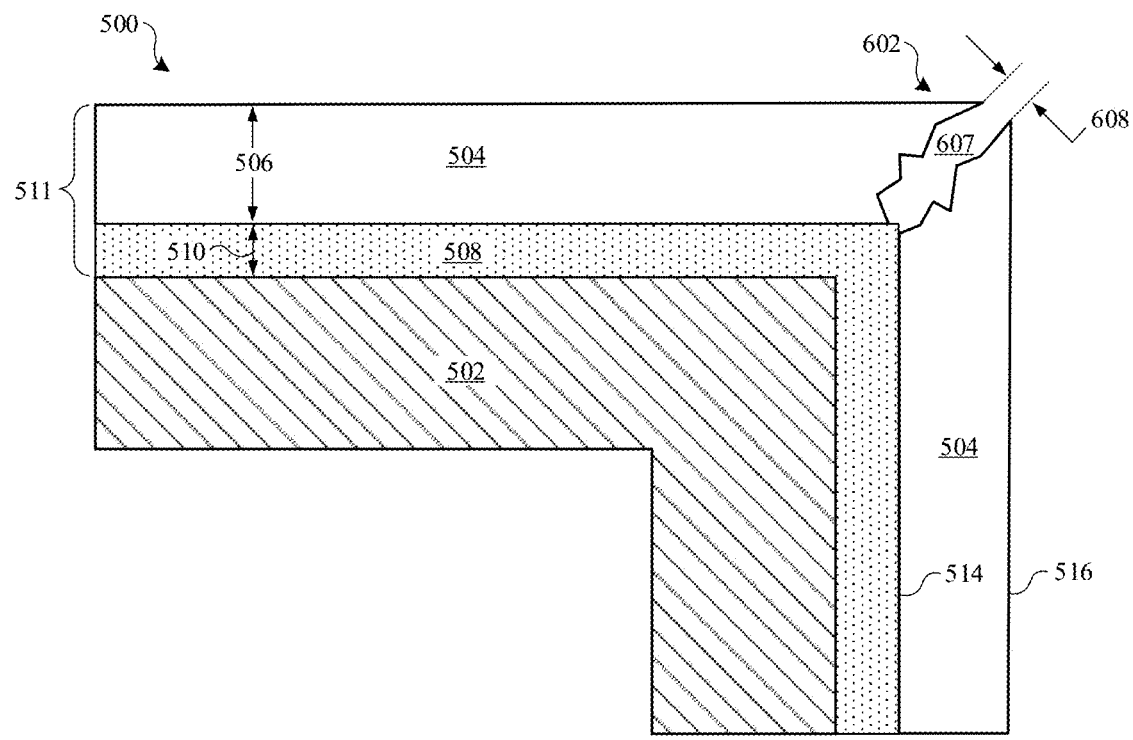
FIGS. 6A-6E show cross-section views of portions of the part in FIGS. 5A-5B having the corrosion-resisting oxide coating.
Figure 6B:
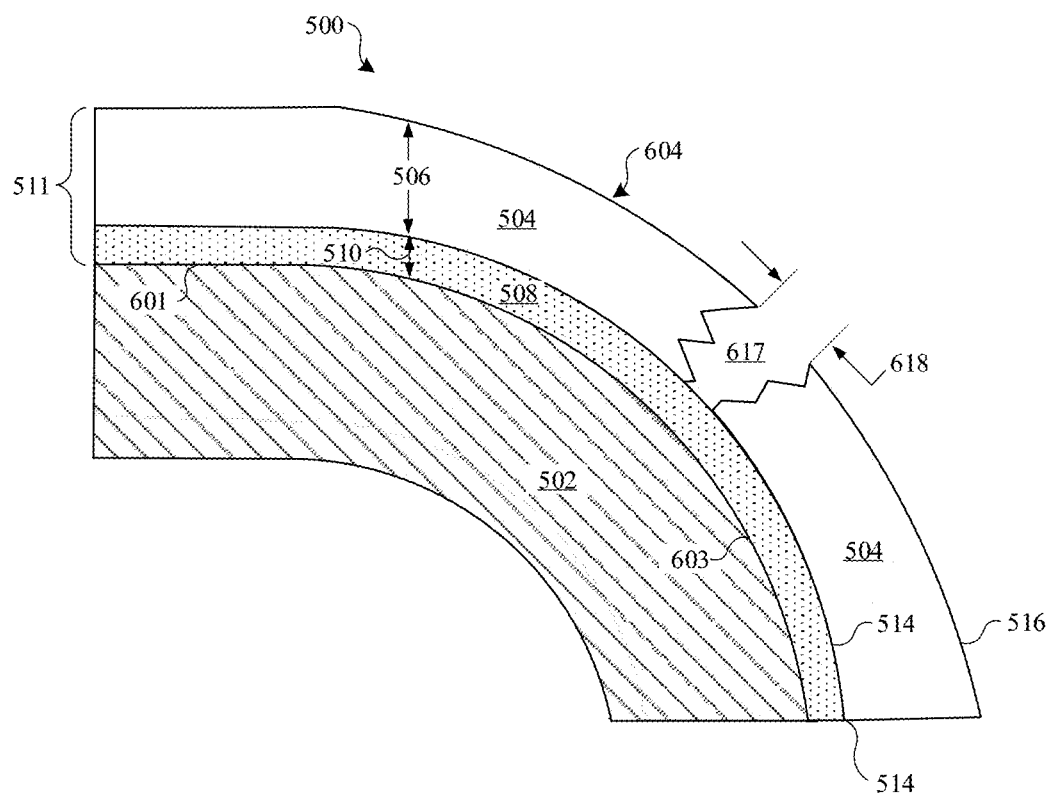

FIGS. 6A-6B show cross-section views of different portions of part 500. Part 500 can correspond to a consumer electronic device, such as device 102, 104, 106 or 108. FIG. 6A shows a portion of part 500 having a convex feature 602, such as a radius of curvature, convex edges, corner or protruding feature. FIG. 6B shows a portion of part 500 having a convex-shaped rounded feature 604, such as a rounded edge (i.e., having a curved profile), corner or protruding feature. The convex feature 602 or convex-shaped rounded feature 604 may also be small features within a textured surface, such as a blast-textured finish, a chemically etched surface, a laser-textured or laser marked finish, which exhibit roughness with features having convex radii. For simplicity, the porous structure of oxide coating 511 is not shown.

FIG. 6A shows first oxide layer 504 has channel 607 in the region over convex feature 602. Anodizing conditions of the first anodizing process combined with the tensile strain at convex feature 602 to form channel 607. As described above, the likelihood of channel 607 being formed, as well as width 608 of channel 607, will depend on conditions of the first anodizing process and the acuteness or sharpness of convex feature 602. In some embodiments, channel 607 has width 608 ranging between about 1 micrometer and about 5 micrometers. In some cases, channel 607 extends lengthwise from outer surface 516 to interface 514 between first oxide layer 504 and second oxide layer 508—i.e., through the entire thickness 506 of first oxide layer 504. In other cases, channel 607 only extends partially through the thickness 506 of first oxide layer 504.

FIG. 6B shows first oxide layer 504 has channel 617 in the region over rounded feature 604. In some embodiments, surface 601 corresponds to a bottom and generally planar surface of a bottom region of an enclosure for an electronic device, and surface 603 corresponds to a curved lateral surface (having a curved profile) of a side portion of the electronic device. Like channel 607, channel 617 was formed during the first anodizing process due, in part, to tensile strain at rounded feature 604. The likelihood of channel 617, and width 618 of channel 617, will depend on conditions of the first anodizing process and the radius of curvature of rounded feature 604. In some case, channel 617 is likely to occur when thickness 506 of first oxide layer 504 is at least 8 micrometers and the radius of curvature of rounded feature 604 is smaller than about 0.5 millimeters. In some embodiments, channel 617 has width 618 ranging between about 1 micrometer and about 5 micrometers. In some cases, channel 617 extends lengthwise from outer surface 516 to interface 514 between first oxide layer 504 and second oxide layer 508—i.e., through the entire thickness 506 of first oxide layer 504. In other cases, channel 617 only extends partially through the thickness 506 of first oxide layer 504.

Although channels 607 and 617 extend at least partially through first oxide layer 504, they do not penetrate through second oxide layer 508. This is because second oxide layer 508 was formed using the second anodizing process under conditions which generate compressive stresses in the oxide film, counteracting and resisting the effective lateral growth strain induced by film growth on convex feature 602 and rounded feature 604. In some cases, channels 607 and 617 only partially enter the second oxide layer 508. In other cases, channels 607 and 617 terminate at interface 514 between first oxide layer 504 and second oxide layer 508. For example, in some embodiments, second oxide layer 508 has an outer surface (defined by interface 514) that generally conforms to the curvature of curved lateral surface 603, while first an outer surface 516 of first oxide layer 504 has channel 617, and therefore does not conform to the curvature of the curved lateral surface 603. In other words, interface 514 can be characterized as having a generally constant and smooth curvature without any interruptions. In contrast, outer surface 516 of first oxide layer 504 includes channel 617, which corresponds to an abrupt discontinuity in the curved profile of outer surface 516. As described herein, the abrupt discontinuity in the curved profile can refer to a convex surface feature that extends from a base portion of the first oxide layer 504.

In other cases, channels 607 and 617 penetrate through first oxide layer 504 and partially through second oxide layer 508. In any case, channels 607 and 617 do not penetrate all the way through thickness 510 of second oxide layer 508. In this way, second oxide layer 508 prevents channels 607 and 617 from extending to substrate 502, thereby preventing substrate 502 from being exposed to any of a number of corrosion-inducing agents and contaminants from various environmental factors such as humidity, high temperatures, or chemicals such as salt, sweat or chlorine. These environmental exposures can be replicated and tested at accelerated rates in controlled lab environments, with salt spray testing or cycles of immersion in artificial sweat. In some cases, part 500 withstands corrosion after about 9 days of continuous salt spray testing at 65 degrees C. and 90% relative humidity (correlating to about 5 years of service in a humid marine environment).

Figure 6C:
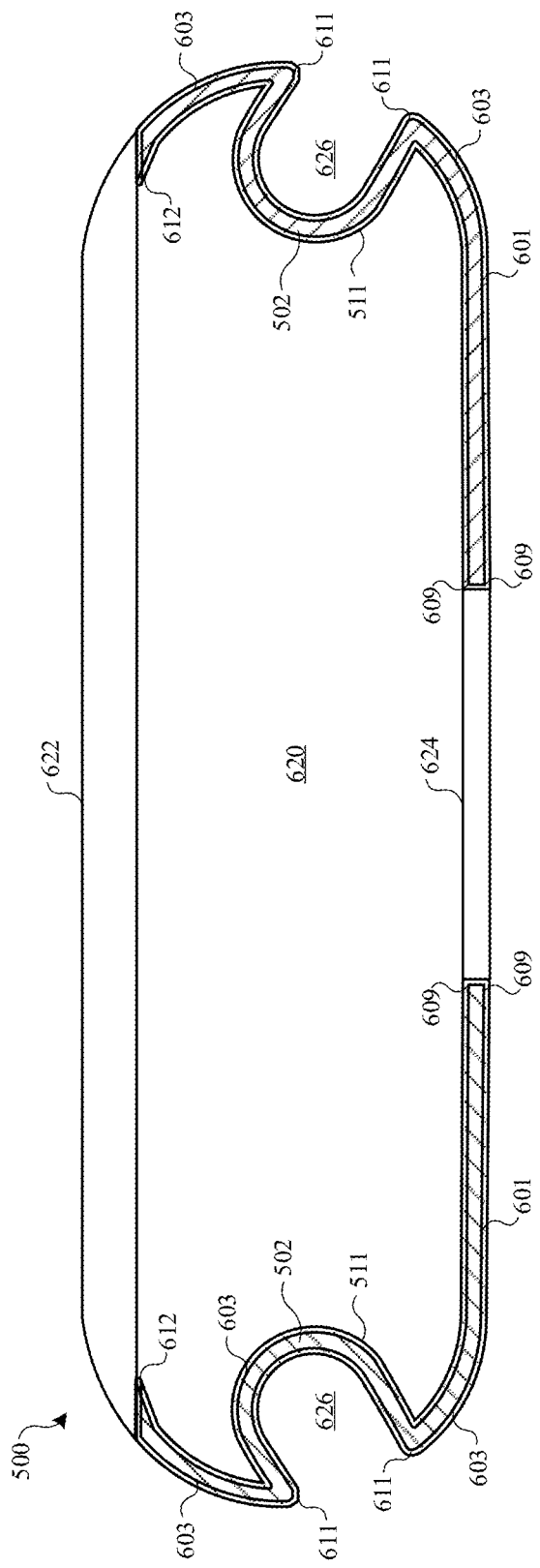

FIG. 6C shows a cross-section view of a greater portion of part 500. As shown, part 500 includes metal substrate 502 that is shaped and sized to form cavity 620, which is suitable for carrying electronic components of part 500. In this way, metal substrate 502 can serve as an enclosure. In a particular embodiment, part 500 corresponds to smart watch 106, described above with reference to FIG. 1. Metal substrate (also referred to as an enclosure or housing) 502 includes recesses 626, which can accept correspondingly shaped portions of a wristband so that part 500 can be worn on a user's wrist. Part 500 also includes cover 622 and component 624, which cooperate with metal substrate 502 to complete the enclosure. In particular embodiments, cover 622 can correspond to a visibly transparent cover for a touch display assembly (not shown) that is configured to accept touch input from a user. Component 624 can include one more light sensors configured to accept input from a user. For example, component 624 can be configured to contact a user's wrist and collect light input related to the user's heart rate. Cover 622 and component 624 can be positioned within respective openings of metal substrate 502 (i.e., within openings of metal enclosure 502).

Oxide coating 511 covers and protects metal substrate 502 from abrasion and exposure to chemical contaminants. Oxide coating 511 can fully cover and follow the contours of metal substrate 502, including over generally planar surface 601 of a bottom region of substrate 502 and curved lateral surface 603 of side region of substrate 502. In some embodiments, curved lateral surface 603 has a spline-shaped curvature. For simplicity, first oxide layer 504 and second oxide layer 508 of oxide coating 511 are not depicted in FIG. 6C. The first oxide layer 504 of oxide coating 511 provides a cosmetically appealing and abrasion resistant outer surface for part 500. The second oxide layer 508 of oxide coating 511 can act as a interstice-free barrier or crack-free barrier, even where portions of outer first oxide layer 504 that may have channels (e.g., 607 or 617 shown in FIGS. 6A and 6B). For example, the first oxide layer 504 portion of oxide coating 511 formed over curved side surfaces 603 and convex edges 609 may have channels from the first anodizing process. Other types of outwardly projecting features of metal substrate 502 that may have oxide coating 511 with channels can include curved regions 611 proximate to recesses 626, and bezel regions 612 proximate to cover 622. In general, those portions of substrate 502 that are junction regions between two non-parallel sides of substrate 502 (e.g., corners, curved or convex edges, protrusions, etc.) may have an oxide coating 511 with channels. The second oxide layer 508 of oxide coating 511 prevents encroachment of corrosion-inducing contaminants from reaching substrate 502 through such channels.

Figure 6D:
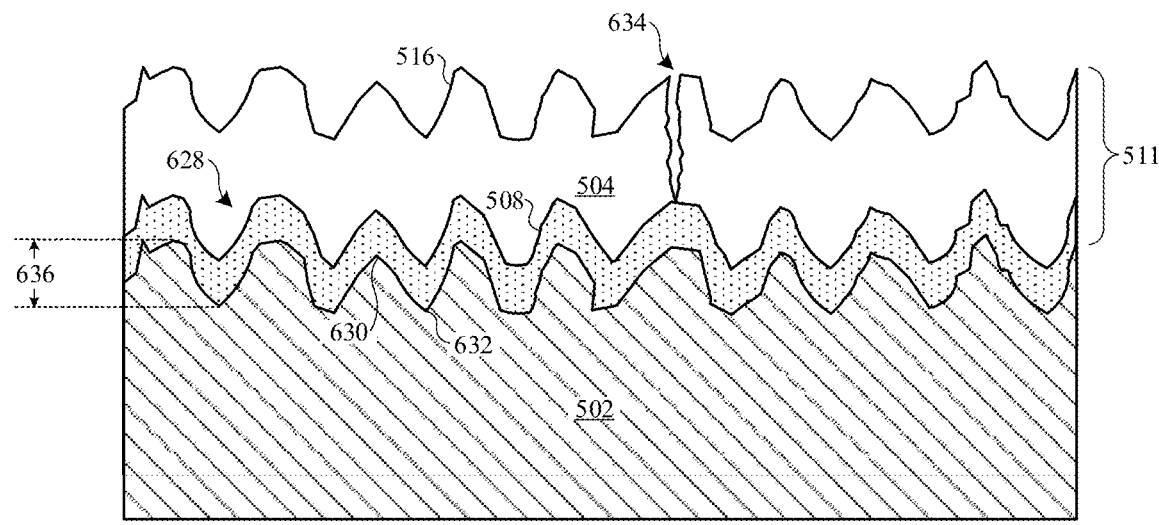
Figure 6E:
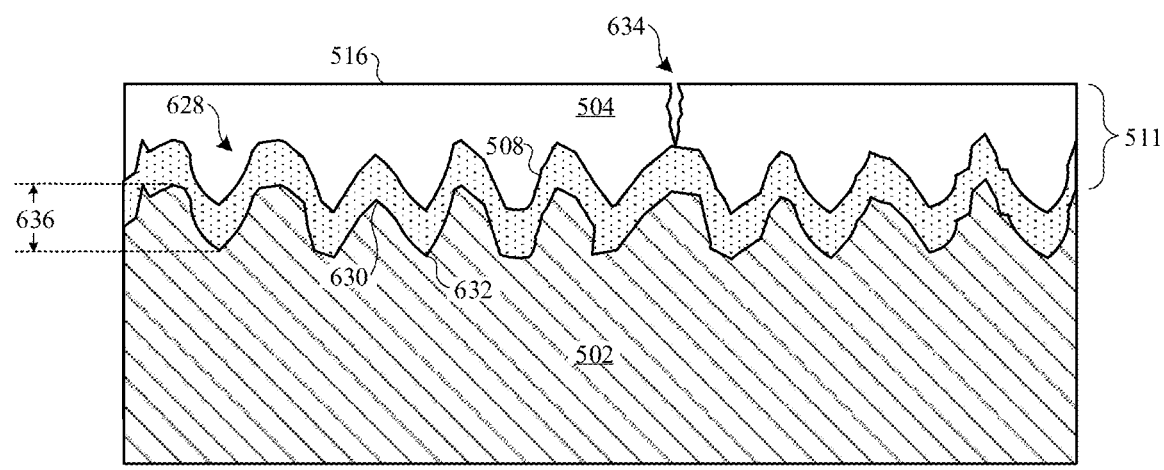

The corrosion-resisting oxide coatings described herein can also be used to protect features having very small dimensions. For example, FIGS. 6D and 6E show cross-section views of such small features on a textured surface 628 of part 500, according to some embodiments. In FIG. 6D, shows part 500 after oxide coating 511 is formed on textured surface 628 of substrate 502, and FIG. 6E shows part 500 after an optional oxide polishing operation is performed to smooth outer surface 516 of oxide coating 511.

Textured surface 628 is formed by treating substrate 502 with one or more surface roughening operations prior to performing the first and second anodizing processes. Suitable roughing operations can include one or more abrasive material blasting, chemical etching, laser processing, or laser-marking (e.g., if textured surface 628 corresponds to the surface of a laser-marked logo, text or other feature). Textured surface 628 is characterized as having a series of peaks 630 and valleys 632 that capture and reflect light in a way that can create matte or sparkling appearance to substrate 502. Since peaks 630 are protrusions (i.e., have convex radii), they can cause localized in-plane tensile strain within first oxide layer 504 during the first anodizing process, and therefore can cause channel 634 to form. Of course, more than one channel 634 can be formed within first oxide layer 504, the prevalence of which will depend on the size of peaks 630, as well as the conditions of the first anodizing process. In some embodiments, peaks 630 having heights 636 of about 5 micrometers or more may cause channel 634 to form using some Type II anodizing processes. In any case, second oxide layer 508, formed using the compressive stress second anodizing process, prevents channel 634 from extending to substrate 502 and thereby protects substrate 502 from exposure to corrosion-inducing agents or other contaminants.

It should be noted that the surface features that can cause sufficient in-plane tensile strain to cause cracks or channels to form during anodizing are not limited to the examples described above. That is, any protruding, outwardly curved, convex-shaped, convex edges or corner surface features may be associated with forming a channel within the first oxide layer. Other examples may include metal surfaces of buttons (e.g., watch crown), switches, bezels, frames, brackets other suitable components of electronic devices. The channels within the first oxide layer may be positioned proximate to the surface features, such as above the surface feature (with the second oxide layer positioned between the first oxide layer and a metal surface of the underlying substrate).

Figure 7A:
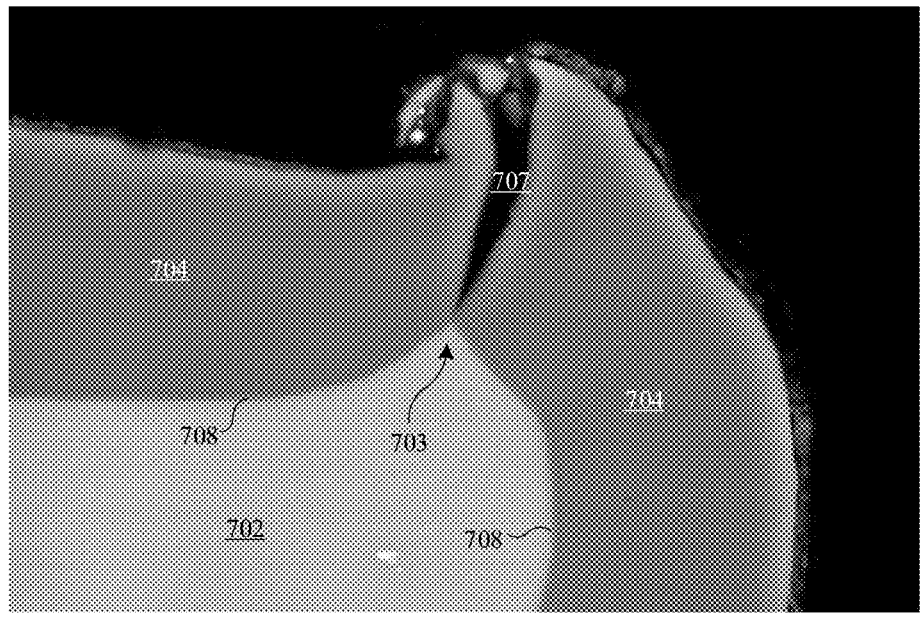
FIGS. 7A and 7B show scanning electron microscope (SEM) images of cross-section views of a part having a corrosion-resisting oxide coating, in accordance with some embodiments.
Figure 7B:
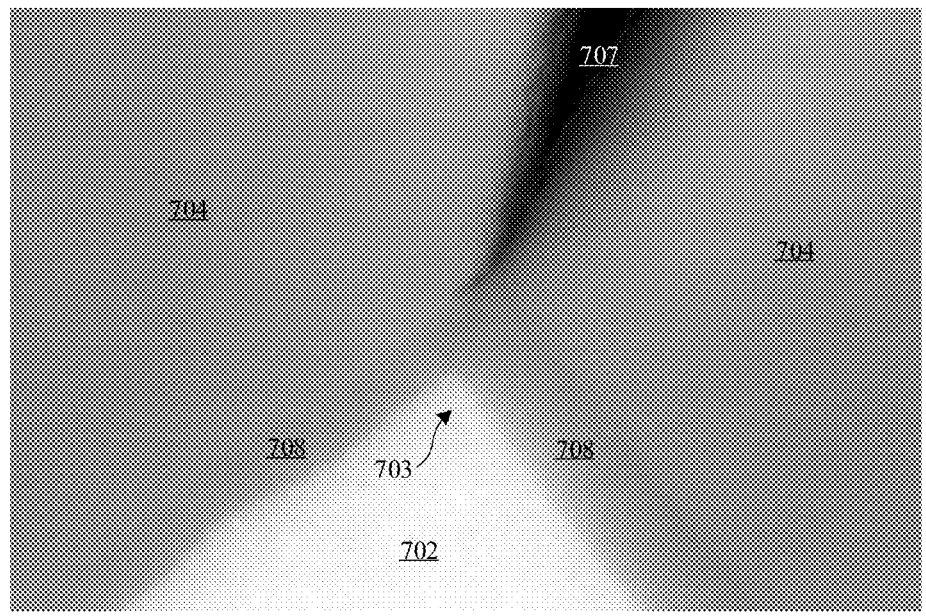

FIGS. 7A and 7B show scanning electron microscope (SEM) images of cross-sections views of a part having a corrosion-resisting oxide coating, with FIG. 7B showing a higher magnification SEM image. The part in FIGS. 7A and 7B includes aluminum alloy substrate 702 having edge 703, which has an oxide coating with first oxide layer 704 (also referred to as an outer oxide layer) formed using a first anodizing process and second oxide layer 708 (also referred to as an inner oxide layer) formed using a compressive stress second anodizing process, as described above. As show, channel 707 formed during the first anodizing process extends at least partially through the thickness of first oxide layer 704 but does not extend through second oxide layer 708, thereby preventing contaminant from reaching substrate 702. This is because second oxide layer 708 is formed under compressive stress conditions that prevent channel 707 from forming within or extending through second oxide layer 708.

Figure 8:
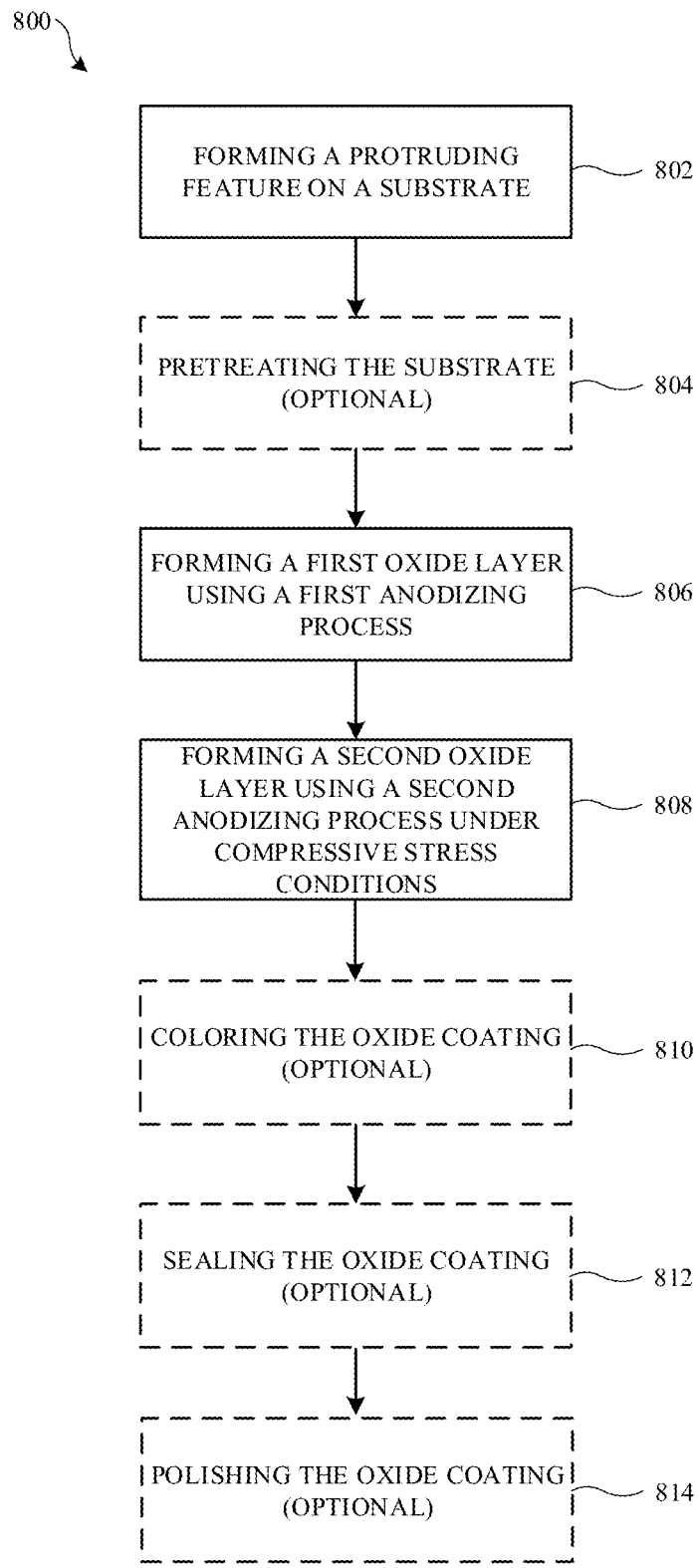
FIG. 8 shows a flowchart indicating a process for forming a corrosion-resisting oxide coating, in accordance with some embodiments.

FIG. 8 illustrates flowchart 800, indicating a process for forming a corrosion-resisting oxide coating on a part, in accordance with some embodiments. At 802, a protruding feature is formed on a substrate, such as an aluminum or an aluminum alloy substrate. The protruding feature can correspond to an edge, corner or other outwardly extending feature. The protruding feature can have a curved profile or an angular profile. In a particular embodiment, protruding feature corresponds to a curved edge or corner of an enclosure for an electronic device. The feature can be formed using any suitable technique, including a machining operation, etching operation, molding operation, or suitable combination thereof. It may even be formed by a surface texturing operation such as blasting, chemical etching, laser processing, or laser-marking of a logo or text.

At 804, the substrate is optionally treated prior to an anodizing process. Suitable pretreatments can include etching, polishing and/or abrasive blasting the surface of the substrate that is to be anodized. In some cases the surface of the substrate is polished to achieve a target gloss value. At 806, a first oxide layer of an oxide coating is formed on the substrate using a first anodizing process. In some applications, the first anodizing process is a Type II anodizing process using an aqueous sulfuric acid electrolyte. The first anodizing process can form a relatively hard first oxide layer (e.g., having a hardness value of at least 350 $HV_{0.05}$); however, these conditions can cause one or more cracks or channels to form within the first oxide layer over the protruding feature.

At 808, a second oxide layer of the oxide coating is formed adjacent the substrate using a second anodizing process. The second anodizing process is performed under compressive stress conditions, which can involve anodizing using a low current density (e.g., 0.8 $A/dm^{-2}$), low voltage, or high electrolyte temperature. The compressive stress conditions result in the second oxide layer to be softer than the first oxide layer, but also less likely to develop a channel, even over the protruding feature. Thus, the second oxide layer acts as a barrier between the outer environment and the substrate, thereby protecting the substrate from exposure to corrosion-inducing agents. The thickness of the second oxide layer is thin (e.g., between about 0.5 and 2 micrometers) such that the majority thickness of the oxide coating is formed under process conditions which yield a relatively hard coating.

At 810, the oxide coating is optionally colored using one or more coloring processes. In some embodiments, this involves depositing a dye and/or metal material within pores of the oxide coating. In other embodiments, the coloring process is skipped such that the oxide coating is substantially colorless. At 812, the oxide coating is optionally sealed using, for example, a hydrothermal sealing process that closes the pores within the oxide coating, thereby further increasing the corrosion-resisting properties of the oxide coating. At 814, the oxide coating is optionally polished using, for example, one or more buffing, lapping or other polishing operations to provide a shine to an exterior surface to the oxide coating.

Figure 9C:
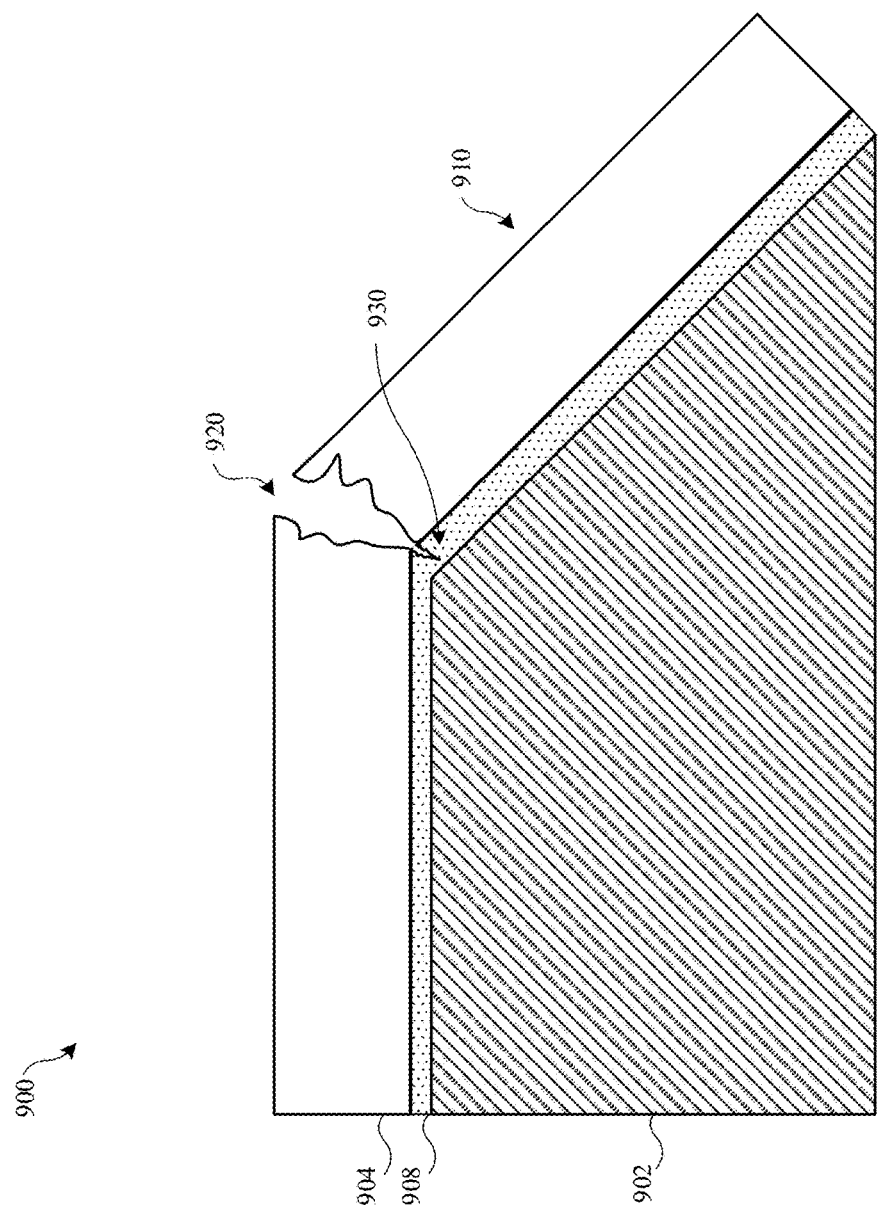

FIGS. 9A-9D illustrate cross-section views of parts having corrosion-resistant metal oxide coatings, in accordance with some embodiments. FIG. 9A illustrates a cross-section view of a part 900 that includes a metal substrate 902 that is overlaid by a metal oxide coating 910. As illustrated in FIG. 9A, the metal substrate 902 includes a surface feature 906 having a convex geometry. As described herein, the surface feature 906 may protrude from a boundary of the metal substrate 902. Additionally, due to the surface feature 906, the metal substrate 902 may be characterized as having a convex polygon shape in which no line segment between two points of a boundary of the polygon shape extends past the polygon shape. Furthermore, all interior angles of the convex polygon shape are less than or equal to 180 degrees.

The metal oxide coating 910 includes a first metal oxide coating 904 and a second metal oxide coating 908. In some embodiments, a portion of the metal substrate 902 is converted to the first metal oxide coating 904 in conjunction with exposing the metal substrate 902 to a first set of electrical parameters. In some embodiments, a portion of the metal substrate 902 is converted to the second metal oxide coating 908 in conjunction with exposing the metal substrate 902 to a second set of electrical parameters that are different than the first set of electrical parameters. In some examples, the first and second set of electrical parameters include at least one of voltage or current density (A/dm$^2$). FIG. 9A further illustrates that the first metal oxide coating 904 includes an interstice 920 that extends at least partially through the first metal oxide coating 904. As described herein, the interstice 920 is formed by the surface feature 906 generating an effective in-plane tensile strain in the metal oxide coating 910 during the anodizing process.

FIG. 9B illustrates a magnified cross-sectional view of the part 900, in accordance with some embodiments. As illustrated in FIG. 9B, the part 900 includes a metal oxide coating 910 having a thickness 912 of between about 12 μm to about 20 μm. The metal oxide coating 910 includes a first metal oxide coating 904 and a second metal oxide coating 908.

In some examples, the first metal oxide coating 904 is characterized as having a thickness 914 that is between about 10 μm to about 18 μm. In some examples, the first metal oxide coating 904 has a thickness 914 that is between about 12 μm to about 14 μm. In some examples, the first metal oxide coating 904 is formed under an anodizing process by exposing the metal substrate 902 to an electrolytic solution using a current density of >1.0 A/dm$^2$. In some examples, the current density is 2 A/dm$^2$>x>1.6 A/dm$^2$. In some examples, the electrolytic solution includes at least one of oxalic acid or sulfuric acid. In some examples, the electrolytic solution includes a mixed acid electrolytic solution, where the mixed acid electrolytic solution includes a combination of oxalic acid and sulfuric acid. More particularly, the mixed acid electrolytic solution may include anywhere from ~10 g/L to ~60 g/L oxalic acid and ~5 g/L to ~40 g/L of sulfuric acid at a temperature range between about 25° C. to about 35° C. In some examples, the mixed acid electrolytic solution includes between about 35-45 g/l oxalic acid and about 15-25 g/l sulfuric acid where a dye is to be subsequently incorporated within the metal oxide coating 910 to impart the metal oxide coating 910 with a color. In some examples, the mixed acid electrolytic solution includes between about 40-60 g/l sulfuric acid and about 10-30 g/l sulfuric acid where the metal oxide coating 910 has a non-transparent color.

In some embodiments, the first metal oxide coating 904 is formed under an in-plane tensile stress condition that results in the formation of the interstice 920 that extends at least partially through the first metal oxide coating 904. It should be noted that the interstice 920 is generally too large to be filled with a sealant. Thus, there is a risk that the interstice 920 will extend into the metal substrate 902 if the part 900 is exposed to additional external contaminants.

In some examples, the second metal oxide coating 908 is characterized as having a thickness 918 that is between about 0.2 μm to about 2 μm. In some examples, the second metal oxide coating 908 has a thickness 918 of about 2 μm. In some examples, the second metal oxide coating 908 is formed under an anodizing process by exposing the metal substrate 902 to an electrolytic solution using a current density of <1.0 A/dm$^2$. More particularly, the metal substrate 902 may be exposed to the electrolytic solution at a current density of <0.7 A/dm$^2$ for a duration between about ~25 minutes to ~35 minutes. As described herein, the first and second metal oxide coatings 904, 908 may be formed using an anodizing bath that includes a single electrolytic solution. In other words, the electrolytic solution is not replaced in conjunction with forming the first and second metal oxide coatings 904, 908. Accordingly, the second metal oxide coating 908 may also be formed using a mixed acid electrolytic solution that includes a combination of oxalic acid and sulfuric acid.

In some embodiments, the second metal oxide coating 908 is formed under a compressive stress condition that is linked to reducing the current density for forming the second metal oxide coating 908 relative to the current density for forming the first metal oxide coating 904. By forming the second metal oxide coating 908 under a compressive stress condition, the second metal oxide coating 908 may cause portions of the interstice 920 to close by pushing metal oxide material (e.g., aluminum oxide, etc.) to fill in portions of the interstice 920. However, one of ordinary skill in the art would appreciate that the entire metal oxide coating 910 cannot be formed using a low current density (i.e., <0.7 A/dm$^2$) because the low current density results in slow growth of the metal oxide coating. Additionally, the resulting metal oxide coating would have a softness that is not suitable for providing sufficient hardness for protecting operational components that are carried within the enclosure, such as display, circuit boards, etc. Indeed, the formation of the second metal oxide coating 908 is a relatively slow process (e.g., ~7 minutes to ~14 minutes, etc.) when one of ordinary skill in the art considers the thickness 918 of the second metal oxide coating 908 relative to a thickness 914 of the first metal oxide coating 904. Additionally, if the metal oxide coating 910 is grown at too slow of a rate, then the metal oxide coating 910 may suffer from erosion during the anodizing process. Thus, to compensate for the slow growth of the second metal oxide coating 908, the rate at which the first metal oxide coating 908 is formed may be increased to prevent erosion. As a result, the metal oxide coating 910 has a Vickers hardness of at least about 300 $Hv_{0.05}$ or greater.

According to some embodiments, voltage control for forming the first and second metal oxide coatings 904, 908 is between about 15 volts to about 25 volts, respectively. In other embodiments, the voltage control is about 17 to 23 volts, respectively for the first and second metal oxide coatings 904, 908. It should be noted that voltage control can be substituted for current density control.

In some embodiments, the metal substrate 902 includes titanium. In using a mixed acid electrolyte, a significant allowance must be made for titanium fixtures as these will draw ~20%-30% of the applied current.

As illustrated in FIG. 9B, the first metal oxide coating 904 includes a first set of pores 924. The second metal oxide coating 908 is distinct from and generally thinner than the first metal oxide coating 904, and the second metal oxide coating 908 includes a second set of pores 928. The second set of pores 928 are finer (e.g., shorter, narrower diameter, etc.) than the first set of pores 924 due to processing the second metal oxide coating 908 at a lower current density and under compressive stress conditions. As a result, the second metal oxide coating 908 has a higher density of pores than the first metal oxide coating 904. In some examples, the difference in average diameters between the first set of pores 924 and the second set of pores 928 is between about 10% to about 20%. For example, the first set of pores 924 may have average diameters between about 45-55 nm and the second set of pores 928 may have average diameters between about 35-45 nm. In some examples, For example, the first set of pores 924 may have average diameters between about 45-50 nm and the second set of pores 928 may have average diameters between about 38-42 nm.

In some embodiments, one or more pores of the second set of pores 928 branch into one or more pores of the first set of pores 924 as a result of significantly reducing the current density while forming the second metal oxide coating 908. As illustrated in FIG. 9B, the second set of pores 928 may extend from the first set of pores 924 at branched regions 926. In some examples, the ratio of the number of the second set of pores 928 to the number of the first set of pores 924 is about 1:1. However, because the second metal oxide coating 908 is thinner than the first metal oxide coating 904, the second metal oxide coating 908 exhibits a greater density of pores than the first metal oxide coating 904, as further described with reference to FIG. 12. Thus, there is an abrupt shift between the first and second metal oxide coatings 904, 908 due to the branching between the first and second set of pores 924, 928.

FIG. 9C illustrates a cross-sectional view of the part 900, in accordance with some embodiments. As illustrated in FIG. 9C, in some examples, the interstice 920 may extend entirely through the thickness 914 of the first metal oxide coating 904. As a result, a crack 930 may be formed within the second metal oxide coating 908. The thickness of the second metal oxide coating 908 prevents the crack 930 from extending into the metal substrate 902. As a result, the second metal oxide coating 908 imparts up to a 50% improvement in preventing corrosion relative to conventional techniques. Additionally, it should be noted that the crack 930 is so small (e.g., <0.1 μm) such that external contaminants cannot reach the metal substrate 902.

Figure 10:
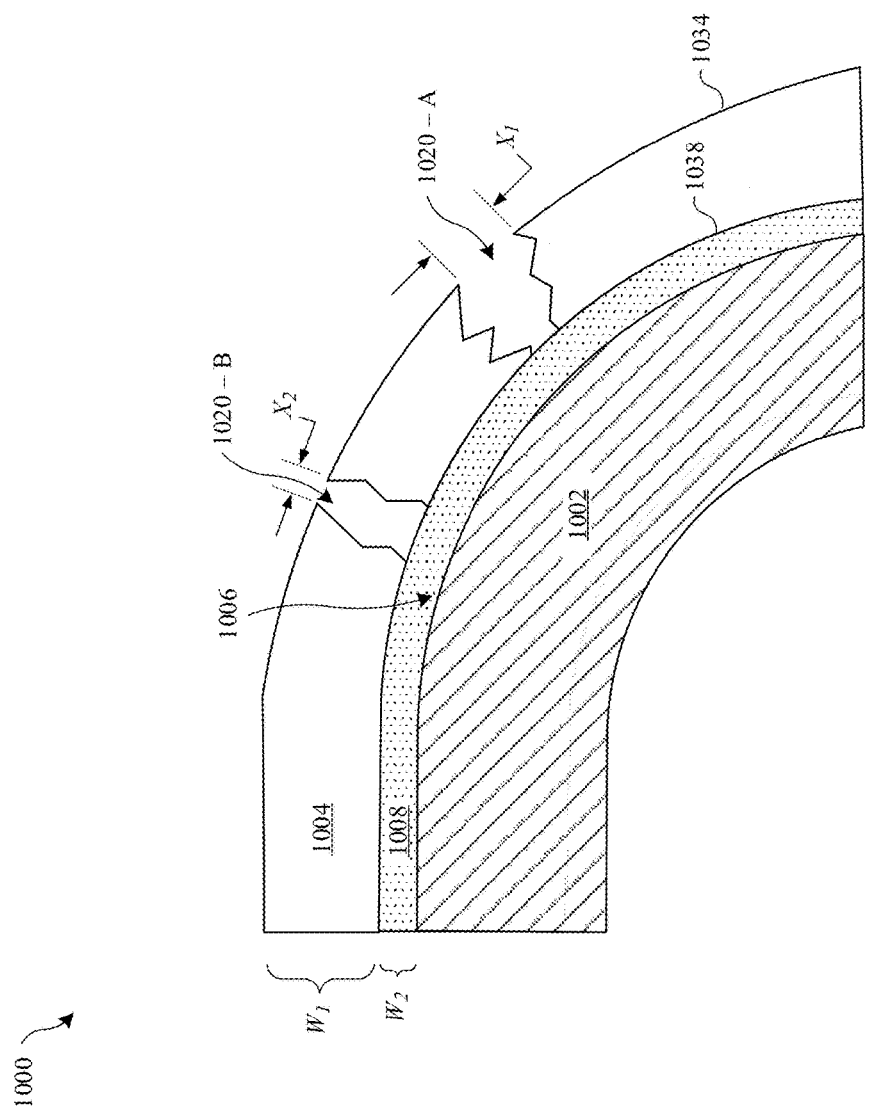
FIG. 10 show a cross-section view of a part having a corrosion-resistant oxide coating, in accordance with some embodiments.

FIG. 10 illustrates a cross-section view of a part having a corrosion-resistant oxide coating, in accordance with some embodiments. In some examples, the part 1000 may correspond to a consumer electronic device, such as device 102, 104, 106 or 108. FIG. 10 shows a portion of part 1000 having a convex-shaped rounded feature 1006, such as a rounded edge (i.e., having a curved profile), corner or protruding feature. The convex-shaped rounded feature 1006 may also be small features within a textured surface, such as a blast-textured finish, a chemically etched surface, a laser-textured or laser marked finish, which exhibit roughness with features having convex radii.

FIG. 10 shows a first oxide layer 1004 that overlays a metal substrate 1002 having a rounded feature 1006. Additionally, a second oxide layer 1008 is disposed between the metal substrate 1002 and the first oxide layer 1004. The first oxide layer 1004 includes an external surface 1034 that corresponds to an exterior surface of an enclosure. FIG. 10 shows first oxide layer 1004 has an interstice 1020-A and interstice 1020-B that extend through the first oxide layer 1004 and reach a surface 1038 of a second oxide layer 1008. The interstices 1020-A, B may be formed in the first oxide layer 1004 during the first anodizing process due, in part, to tensile strain at rounded feature 1006. The width ($X_1$) of the interstice 1020-A and the width ($X_2$) of the interstice 1020-B will depend on conditions of the first anodizing process and the radius of curvature of rounded feature 1006.

In some examples, the widths ($X_1$) and ($X_2$) of the interstices 1020-A, B are different from each other. In some examples, the widths ($X_1$) and ($X_2$) of the interstices 1020-A, B are between about 1 micrometer to about 5 micrometers. In some examples, the interstices 1020-A, B extend through partially or the entire thickness ($W_1$) of the first oxide layer 1004. However, the interstices 1020-A, B are not illustrated as penetrating the thickness ($W_2$) of the second oxide layer 1008. This is because second oxide layer 1008 was formed using the second anodizing process under conditions which generate compressive stresses in the oxide film, counteracting and resisting the effective lateral growth strain induced by film growth on the rounded feature 1006. In some cases, interstices 1020-A, B only partially enter the second oxide layer 1008, but these interstices 1020-A, B are so small (e.g., <1 micrometer) such that external contaminants are generally unable to reach the underlying metal substrate 1002.

In some examples, the thickness ($W_1$) of the first oxide layer 1004 is about 12±3 micrometers. In other examples, the thickness ($W_1$) of the first oxide layer 1004 is 12 micrometers. In other examples, the thickness ($W_2$) of the second oxide layer 1008 is about 2±1 micrometers. In other examples, the thickness ($W_2$) of the second oxide layer 1008 is 2 micrometers.

Figure 11:
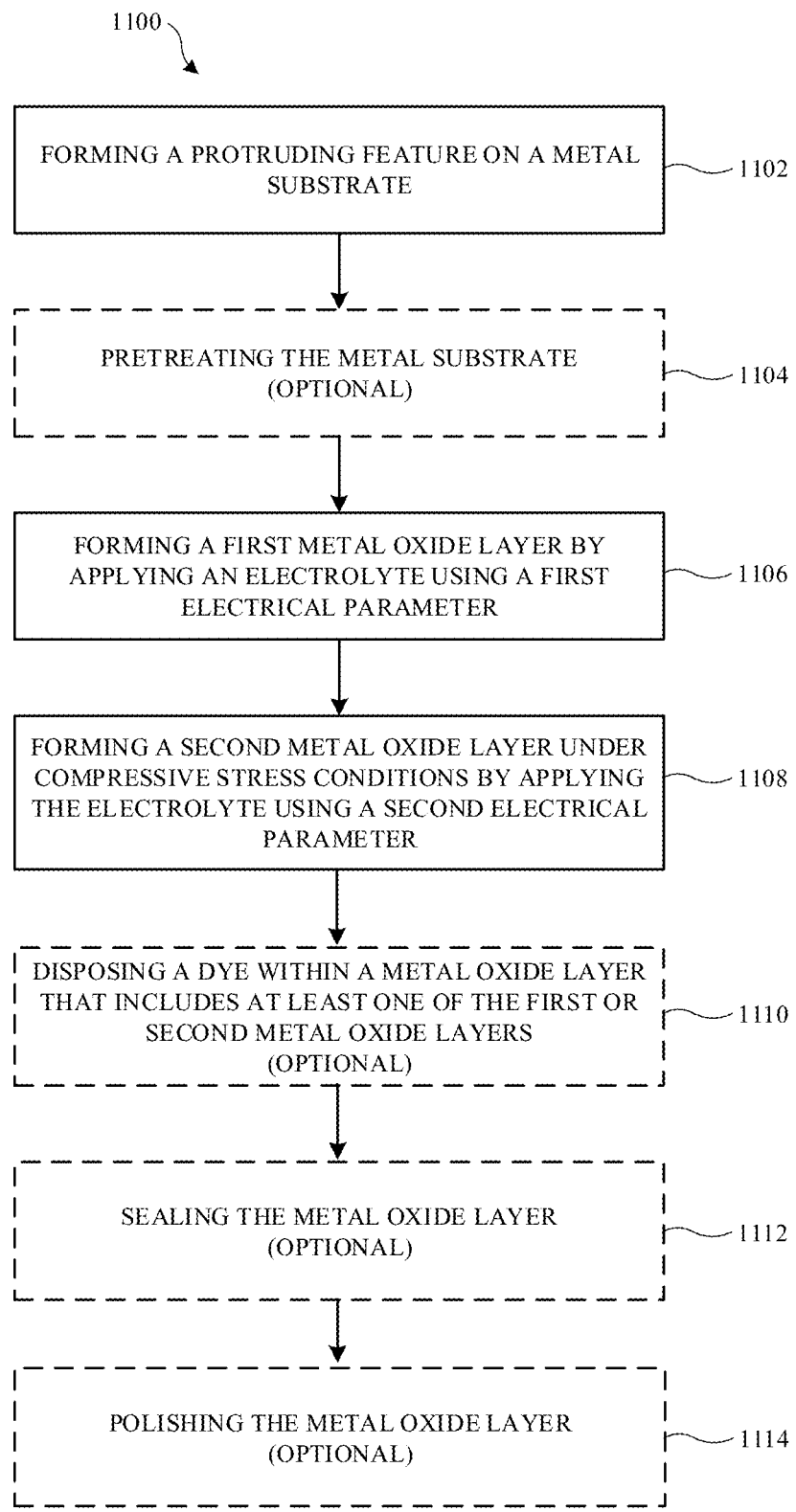
FIG. 11 shows a flowchart for forming a corrosion-resistant oxide coating, in accordance with some embodiments.
Figure 12A:
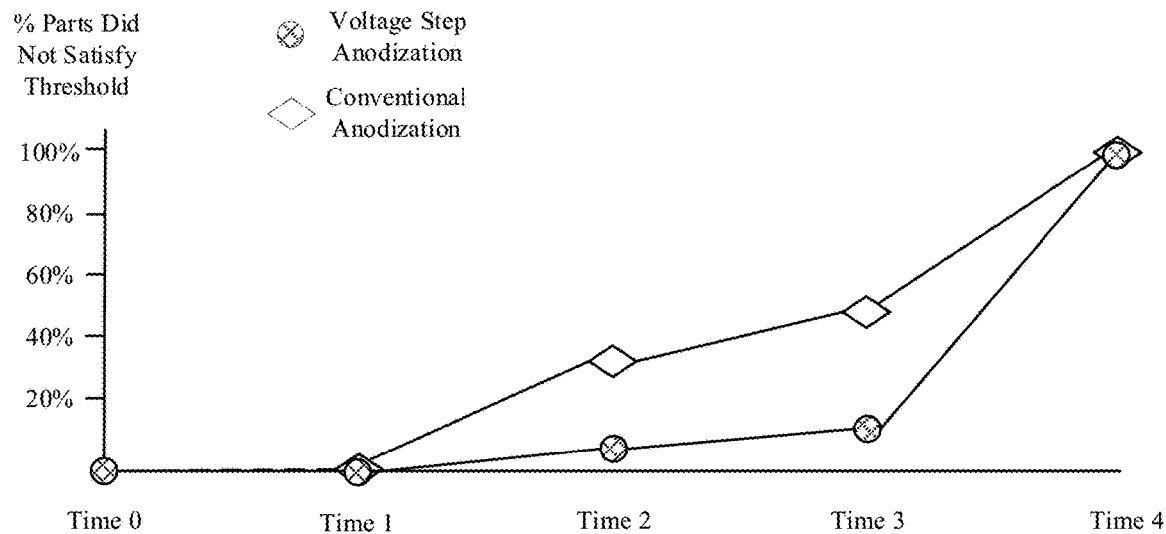
FIGS. 12A-12D show comparisons between parts formed with conventional anodization and voltage step anodization, in accordance with some embodiments.
Figure 12B:
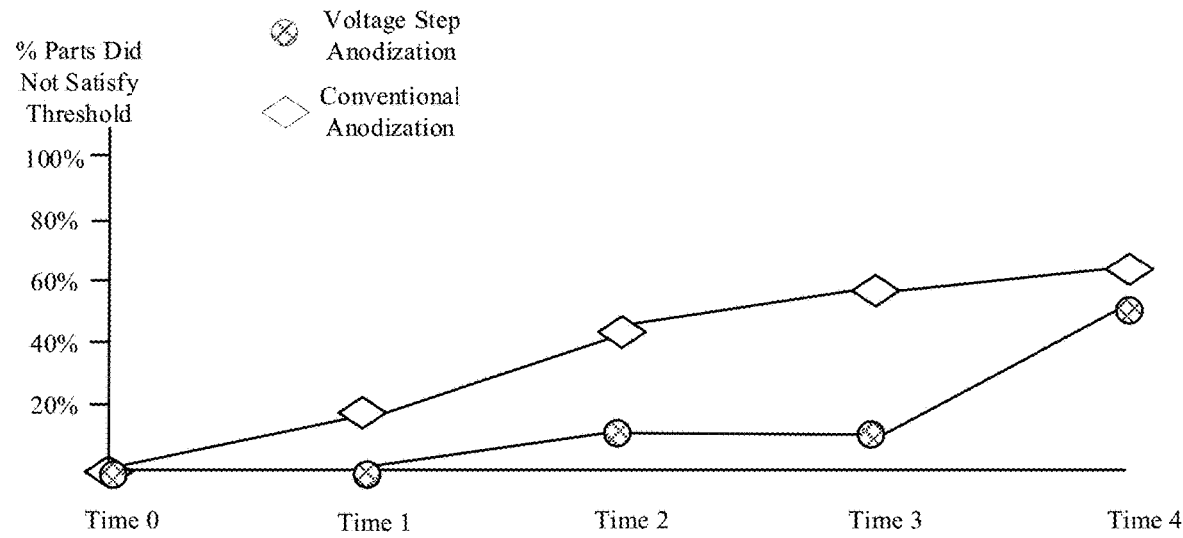
Figure 12C:
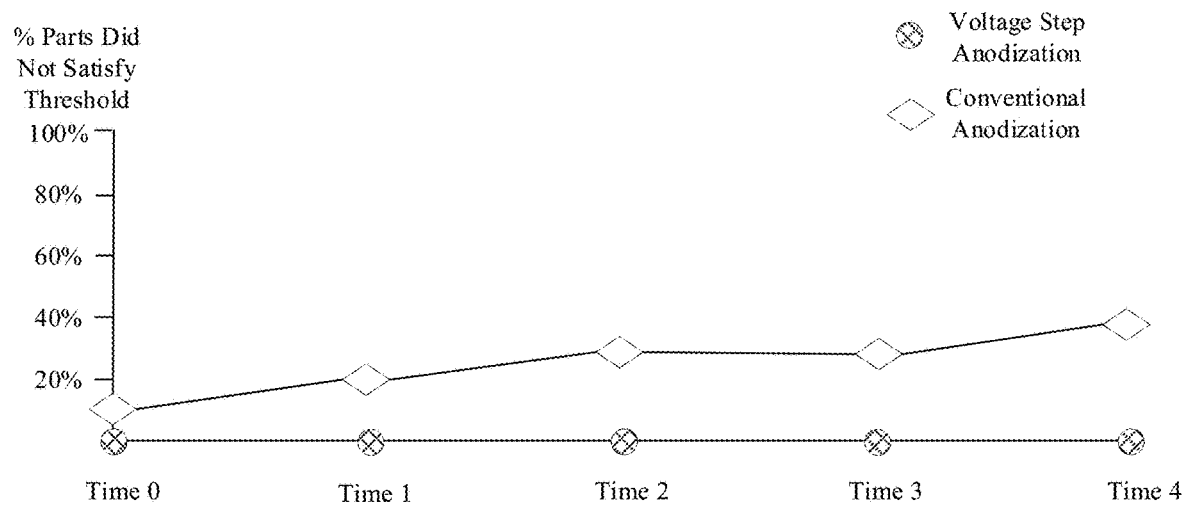
Figure 12D:
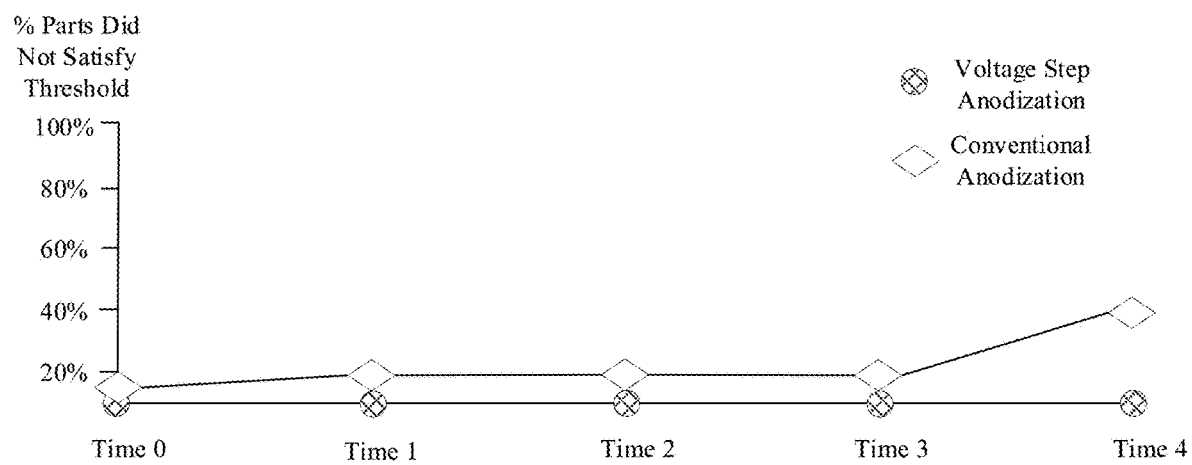

FIG. 11 illustrates a flowchart 1100 for forming a corrosion-resistant oxide coating on a part, in accordance with some embodiments. At step 1102, a surface feature 906 is formed on the metal substrate 902, such as an aluminum or an aluminum alloy substrate. The surface feature 906 can correspond to an edge, corner or other outwardly extending feature. The surface feature 906 can have a curved profile or an angular profile. The surface feature 906 may be formed using any suitable technique, including a machining operation, etching operation, molding operation, or suitable combination thereof. It may even be formed by a surface texturing operation such as blasting, chemical etching, laser processing, or laser-marking of a logo or text.

At step 1104, the metal substrate 902 is optionally treated prior to an anodizing process. Suitable pretreatments can include etching, polishing and/or abrasive blasting the surface of the metal substrate 902 that is to be anodized. In some cases the surface of the metal substrate 902 is polished to achieve a target gloss value.

At step 1106, a first metal oxide coating 904 is formed from the metal substrate 902 by exposing the metal substrate 902 to an electrolytic acid solution using a first electrical parameter. In some examples, the first electrical parameter is a voltage or a current density. In particular, the voltage is between about 18-22 volts, whereas the current density is >1.0 A/dm$^2$. Additionally, the first metal oxide coating 904 is formed under a tensile stress condition. The electrolytic acid solution may be a mixed acid electrolyte that includes a combination of oxalic acid and sulfuric acid. The metal oxide coating 904 (e.g., having a hardness value of at least 350 HV$_{0.05}$); however, these conditions can cause one or more cracks or interstice 920 to form within the first metal oxide coating 904 over the surface feature 906.

At step 1108, a second metal oxide coating 908 of the metal oxide coating 910 is formed between the metal substrate 902 and the first metal oxide coating 904. The second metal oxide coating 908 is performed under compressive stress conditions while anodizing using a low current density (e.g., <0.7 A/dm$^2$), low voltage, or high electrolyte temperature. In some embodiments, the first and second metal oxide coatings 904, 908 are anodized under a voltage step anodization process. The voltage step anodization refers to reducing the current density or voltage control in conjunction with forming the second metal oxide coating 908. In some embodiments, the second metal oxide coating 908 is anodized using a mixed acid electrolyte. In some examples, the same mixed acid electrolyte is used to form the first and second metal oxide coatings 904, 908. In some embodiments, a programmable rectifier controller, capable of multiple process segments and timed ramps is used. The current and voltage specification of the rectifier must be suitable for processing the load under the conditions described herein.

The compressive stress conditions result in the second metal oxide coating 908 to be softer than the first metal oxide coating 904, but also less likely to develop an interstice—e.g., the interstice 920. Thus, the second metal oxide coating 908 acts as a barrier between the outer environment and the substrate, thereby protecting the metal substrate 902 from exposure to corrosion-inducing agents.

At step 1110, the metal oxide coating 910 is optionally colored using one or more coloring processes. In some embodiments, this involves depositing a dye and/or metal material within at least one of the first or second set of pores 914, 918 of the metal oxide coating 910.

At 1112, the metal oxide coating 910 is optionally sealed using, for example, a hydrothermal sealing process that closes the first and second set of pores 914, 918 within the metal oxide coating 910, thereby further increasing the corrosion-resisting properties of the oxide coating. At step 1014, the metal oxide coating 910 is optionally polished using, for example, one or more buffing, lapping or other polishing operations to provide a shine to an exterior surface to the metal oxide coating 910.

FIGS. 12A-12D illustrate comparisons between parts formed with conventional anodization and voltage step anodization, in accordance with some embodiments. As described herein, the voltage step anodization refers to forming the first metal oxide coating—e.g., the first metal oxide coating 904 at a current density >1.0 A/dm$^2$, and forming the second metal oxide coating—e.g., the second metal oxide coating 908 at a reduced current density <0.7 A/dm$^2$.

As illustrated in FIGS. 12A-12D, different parts were tested for corrosion resistance based on immersion to sweat. In particular, the parts were compared to a threshold value for one or more structural and/or cosmetic characteristics (e.g., surface finish, structural rigidity, hardness, color, etc.). The parts anodized using the voltage step process exhibited significant improvement in corrosion resistance ~up to 50% improvement in preventing corrosion relative to conventional anodizing processes. The parts were tested under simulated accelerated aging tests as indicated by Time 0, Time 1, Time 2, Time 3, and Time 4. FIGS. 12A-12D illustrate the (a) percentage of parts that were anodized using voltage step anodization that did not satisfy a threshold level for the one or more structural and/or cosmetic characteristics, and (b) percentage of parts that were anodized using conventional anodization processes that did not satisfy a threshold level for the one or more structural and/or cosmetic characteristics. As illustrated in FIGS. 12A-12D, a significant percentage of the parts anodized using the voltage step process satisfies the threshold.

Figure 13:
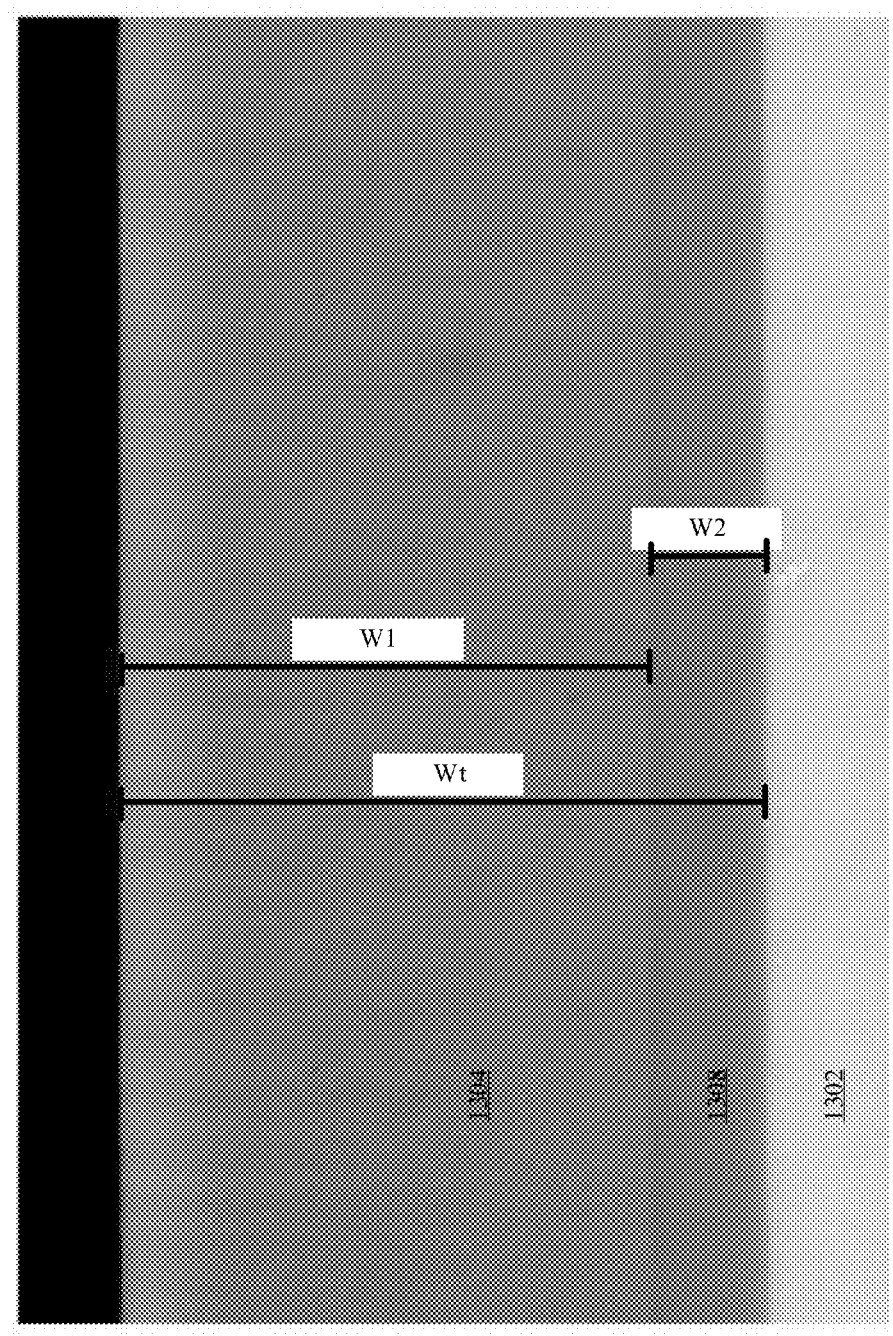
FIG. 13 illustrates an electron microscope image of the part as formed using the techniques described herein, in accordance with some embodiments.

FIG. 13 illustrates an electron microscope image of the part as formed using the techniques described herein, in accordance with some embodiments. As illustrated in FIG. 13, the second metal oxide coating 1308 exhibits a greater density of pores than the first metal oxide coating 1304, which is indicated by the second metal oxide coating 1308 imaging darker than the first metal oxide coating 1304. In some examples, first metal oxide coating 1304 has a thickness ($W_1$), the second metal oxide coating 1308 has a thickness ($W_2$), and the part has an overall thickness ($W_t$).

In some examples, the thickness ($W_1$) of the first oxide coating 1304 is about 12±3 micrometers. In some examples, the thickness ($W_2$) of the second oxide coating 1308 is about 2±1 micrometers. In some examples, the thickness ($W_t$) of the oxide coating that includes the first and second oxide coatings is 15±3 micrometers.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An enclosure for a portable electronic device, the enclosure comprising:
    a metal substrate having a surface that includes a surface feature;
    a first metal oxide layer that overlays the surface of the metal substrate, wherein the first metal oxide layer includes:
        a first set of pores that extend from an external surface of the enclosure and towards the metal substrate, and
        an interstice that is dependent upon the surface feature, wherein the interstice extends at least partially through the first oxide layer; and
    a second metal oxide layer that is disposed between the metal substrate and the first metal oxide layer, the second metal oxide layer adhered directly to the metal substrate, wherein the second metal oxide layer includes a second set of pores having an average diameter that is less than and at least half of the average diameter of the first set of pores.

2. The enclosure of claim 1, wherein the second metal oxide layer has a thickness between 0.5 micrometer to 2 micrometers.

3. The enclosure of claim 1, wherein the first metal oxide layer has a thickness between 10 micrometers to 17 micrometers.

4. The enclosure of claim 1, wherein the first set of pores having an average diameter, and the average diameter of the second set of pores is between 10% to 25% less than the average diameter of the first set of pores.

5. The enclosure of claim 1, wherein the metal substrate includes at least one of magnesium or zinc.

6. The enclosure of claim 1, wherein the first and second set of pores are sealed with a sealant.

7. The enclosure of claim 1, wherein the interstice has a first width, and the sealant has a second width that is less than the first width such that the sealant is unable to fill the interstice.

8. The enclosure of claim 1, further comprising:
    dye particles that are disposed within the first set of pores.

9. An enclosure for a portable electronic device, the enclosure comprising:
    an aluminum alloy substrate including a convex surface feature;
    an anodized layer that overlays the aluminum alloy substrate, wherein the anodized layer includes:
        a first anodized layer including an interstice having a geometry that is based on the convex surface feature, the first anodized layer having a first thickness and a first set of pores, and
        a second anodized layer that is disposed between the aluminum alloy substrate and the first anodized layer, the second anodized layer adhered directly to the metal substrate, wherein the second anodized layer has a second thickness that is less than the first thickness and a second set of pores having an average diameter that is less than and at least half of the average diameter of the first set of pores.

10. The enclosure of claim 9, wherein the first thickness is between 10 micrometers to 17 micrometers.

11. The enclosure of claim 10, wherein the second thickness is between 0.2 micrometer to 2 micrometers.

12. The enclosure of claim 9, further comprising:
dye particles that are disposed within the first set of pores.

13. The enclosure of claim 9, wherein the anodized layer has a Vickers hardness of at least 300 $Hv_{0.05}$ or greater.

14. A method for forming an enclosure for a portable electronic device, the enclosure including a metal substrate having a surface feature, the method comprising:
converting a first amount of the metal substrate to a first metal oxide layer under a tensile strain condition that corresponds to a first electrical parameter, wherein the first metal oxide layer includes a first set of pores and an interstice that is based on a geometry of the surface feature; and
converting a second amount of the metal substrate to a second metal oxide layer under a compressive stress condition that corresponds to a second electrical parameter that is less than the first electrical parameter, wherein the second metal oxide layer is adhered directly to the metal substrate and overlaid by the first metal oxide layer, wherein the second metal oxide layer includes a second set of pores having an average diameter that is less than and at least half of the average diameter of the first set of pores.

15. The method of claim 14, wherein the first electrical parameter includes a current density greater than 1.0 $A/dm^2$, and the second electrical parameter includes a current density of less than 0.8 $A/dm^2$.

16. The method of claim 14, wherein the metal substrate is converted to the first and second metal oxide layers by exposing the metal substrate to a mixed electrolytic acid.

17. The method of claim 16, wherein the mixed electrolytic acid includes sulfuric acid and oxalic acid.

18. The method of claim 14, wherein a size of the interstice is based at least on an acuteness of the geometry of the surface feature.

* * * * *